US011757672B2

(12) United States Patent
Rico Alvarino et al.

(10) Patent No.: US 11,757,672 B2
(45) Date of Patent: *Sep. 12, 2023

(54) STANDALONE MULTICAST BROADCAST SINGLE FREQUENCY NETWORK CELL ACQUISITION

(71) Applicant: QUALCOMM Incorporated, San Diego, CA (US)

(72) Inventors: Alberto Rico Alvarino, San Diego, CA (US); Wanshi Chen, San Diego, CA (US); Shimman Patel, San Diego, CA (US); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/391,893

(22) Filed: Aug. 2, 2021

(65) Prior Publication Data

US 2021/0367799 A1    Nov. 25, 2021

Related U.S. Application Data

(63) Continuation of application No. 15/444,708, filed on Feb. 28, 2017, now Pat. No. 11,102,024.

(Continued)

(51) Int. Cl.
*H04L 12/18* (2006.01)
*H04W 56/00* (2009.01)
(Continued)

(52) U.S. Cl.
CPC ............ *H04L 12/189* (2013.01); *H04W 4/90* (2018.02); *H04W 48/16* (2013.01);
(Continued)

(58) Field of Classification Search
CPC ...... H04L 12/189; H04W 4/90; H04W 48/16; H04W 52/0216; H04W 52/0219;
(Continued)

(56) References Cited

U.S. PATENT DOCUMENTS 8,811,291 B2    8/2014    Mohseni et al.
8,861,502 B2    10/2014   Soliman
(Continued)

FOREIGN PATENT DOCUMENTS

CN    102469430 A    5/2012
CN    102870455 A    1/2013
(Continued)

OTHER PUBLICATIONS

Samsung, "Clarification of UE Action (Behaviour) for Otherwise in conditions", "36331_CROxxx_(REL-11)", 3GPP TSG-RAN2 Meeting #82, R2-131763, Fukuoka, Japan, May 20-24, 2013, 169 Pages.
(Continued)

*Primary Examiner* — Abdullahi Ahmed
(74) *Attorney, Agent, or Firm* — Procopio, Cory, Hargreaves & Savitch LLP

(57) ABSTRACT

Standalone MBSFN cells may provide an improved user experience for an individual with a non-legacy UE since the bandwidth of that cell is mostly allocated to broadcasting streaming services. However, an individual with a legacy UE may be able to detect cell acquisition information associated with a standalone MBSFN cell but not to acquire standalone MBSFN cells. In order to solve this problem, the present disclosure provides various UE avoidance schemes that enable non-legacy UEs to acquire a standalone MBSFN cell and prevents legacy UEs from trying to acquire a standalone MBSFN only cell. The apparatus may receive cell acquisition information associated with an eMBMS standalone cell. The apparatus may detect a UE avoidance
(Continued)

scheme based on a characteristic associated with the cell acquisition information. The apparatus may perform cell acquisition with the eMBMS standalone cell based on the characteristic.

30 Claims, 14 Drawing Sheets

Related U.S. Application Data

(60) Provisional application No. 62/315,584, filed on Mar. 30, 2016.

(51) Int. Cl.
*H04W 4/90* (2018.01)
*H04W 52/02* (2009.01)
*H04W 48/16* (2009.01)
*H04W 72/30* (2023.01)
*H04W 72/51* (2023.01)

(52) U.S. Cl.
CPC ... *H04W 52/0216* (2013.01); *H04W 52/0219* (2013.01); *H04W 56/001* (2013.01); *H04W 52/02* (2013.01); *H04W 72/30* (2023.01); *H04W 72/51* (2023.01); *Y02D 30/70* (2020.08)

(58) Field of Classification Search
CPC . H04W 56/001; H04W 52/02; H04W 72/005; H04W 72/048; H04W 4/06; Y02D 30/70
See application file for complete search history.

(56) References Cited

U.S. PATENT DOCUMENTS

| | | |
|---|---|---|
| 8,989,174 B2 | 3/2015 | Montojo et al. |
| 9,088,919 B2 | 7/2015 | Surapaneni et al. |
| 9,553,701 B2 | 1/2017 | Sadeghi et al. |
| 9,924,443 B2 | 3/2018 | Tinnakornsrisuphap et al. |
| 11,102,024 B2* | 8/2021 | Rico Alvarino .. H04W 52/0219 |
| 2013/0176886 A1 | 7/2013 | Joung et al. |
| 2013/0303166 A1 | 11/2013 | Jain et al. |
| 2014/0016491 A1 | 1/2014 | Gholmieh et al. |
| 2014/0086173 A1* | 3/2014 | Sadeghi .............. H04W 72/048 370/328 |
| 2014/0126508 A1 | 5/2014 | Young et al. |
| 2014/0134970 A1* | 5/2014 | Pazos ....................... H04M 3/00 455/404.1 |
| 2014/0317315 A1 | 10/2014 | Duchesneau |
| 2014/0355418 A1 | 12/2014 | Mohseni et al. |
| 2015/0036645 A1 | 2/2015 | Shin et al. |
| 2015/0078245 A1* | 3/2015 | Anchan ................. H04W 76/40 370/312 |
| 2015/0081851 A1* | 3/2015 | Oyman ............. H04W 36/0058 709/219 |
| 2015/0245246 A1 | 8/2015 | Golitschek Edler Von Elbwart |
| 2015/0319797 A1 | 11/2015 | Yamada et al. |
| 2016/0212595 A1 | 7/2016 | Fukuta et al. |
| 2016/0286445 A1 | 9/2016 | Jung et al. |
| 2017/0207924 A1 | 7/2017 | Lee et al. |
| 2017/0288888 A1 | 10/2017 | Rico Alvarino et al. |

FOREIGN PATENT DOCUMENTS

| | | |
|---|---|---|
| JP | 2015536097 A | 12/2015 |
| WO | 2009111181 | 9/2009 |
| WO | 2011044290 A1 | 4/2011 |
| WO | 2013126846 A1 | 8/2013 |
| WO | 2013155376 | 10/2013 |
| WO | 2013181113 | 12/2013 |
| WO | 2014052412 A2 | 4/2014 |
| WO | 2015065053 A1 | 5/2015 |

OTHER PUBLICATIONS

Shuhui L., "Research on Radio Resource Management in LTE and Two-tier Macrocell/Femtocell Networks", Information Science and Technology, Jan. 31, 2013.
3rd Generation Partnership Project; Technical Specification Group Radio Access Network; Evolved Universal Terrestrial Radio Access (E-UTRA); User Equipment (UE) Procedures in Idle Mode (Release 13), 3GPP Draft; 3GPP TS 36.304; 3rd Generation Partnership Project, Mobile Competence Centre; 650, Route Des Lucioles; F-06921 Sophia-Antipolis Cedex; France, Mar. 14, 2016, V13.1.0, XP051081394, 43 pages, From Internet: URL: http://www.3gpp.org/ftp/tsg_ran/WG2_RL2/Specifications/201603_draft_specs_after_RAN_71/ [retrieved on Mar. 14, 2016].
Ericsson, et al., "Motivation for eMBMS Enhancements for LTE", 3GPP TSG-RAN #71, 3GPP Draft; RP-160274 Motivation EMBMS Enhancements for LTE, 3rd Generation Partnership Project (3GPP), Mobile Competence Centre; 650, Route Des Lucioles; F-06921 Sophia-Antipolis Cedex; France, vol. TSG RAN, No. Goteborg, Sweden; Mar. 7, 2016-Mar. 10, 2016, Mar. 6, 2016 (Mar. 6, 2016), pp. 1-2, XP051076228, Retrieved from the Internet: URL: http://www.3gpp.org/ftp/Meetings_3GPP_SYNC/RAN/Docs/ [retrieved on Mar. 6, 2016].
European Search Report—EP19172390—Search Authority—Munich—dated Jun. 21, 2019.
International Preliminary Report on Patentability—PCT/US2017/020089, The International Bureau of WIPO—Geneva, Switzerland dated Oct. 2, 2018.
International Search Report and Written Opinion—PCT/US2017/020089—ISA/EPO—dated Jul. 10, 2017.
Partial International Search Report—PCT/US2017/020089—ISA/EPO—dated May 16, 2017.
Ericsson: "Introduction of eMBMS Enhancements for LTE", 3GPP TSG-RAN WG1 Meeting #87,R1-1613812, Reno, NV, USA, Nov. 14-18, 2016, URL: https://www.3gpp.org/ftp/tsg_ran/WG1_RL1/TSGR1_87/Docs/R1-1613812.zip, 23 Pages.
Qualcomm Incorporated: "Standalone eMBMS Carrier", 3GPP TSG RAN WG1 Meeting #85,R1-164442, Nanjing, China May 23-27, 2016, URL: https://www.3gpp.org/ftp/TSG_RAN/WG1_RL1/TSGR1_85/Docs/R1-164442.zip, pp. 1-4.

* cited by examiner

STANDALONE MULTICAST BROADCAST SINGLE FREQUENCY NETWORK CELL ACQUISITION

CROSS-REFERENCE TO RELATED APPLICATION(S)

This application is a continuation of U.S. Non-provisional application Ser. No. 15/444,708, entitled "STANDALONE MULTICAST BROADCAST SINGLE FREQUENCY NETWORK CELL ACQUISITION" and filed Feb. 28, 2017, which claims the benefit of U.S. Provisional Application Ser. No. 62/315,584, entitled "STANDALONE MULTICAST BROADCAST SINGLE FREQUENCY NETWORK CELL ACQUISITION" and filed on Mar. 30, 2016, which is expressly incorporated by reference herein in its entirety.

TECHNICAL FIELD

The present disclosure relates generally to communication systems, and more particularly, to a communication system that includes a standalone multicast broadcast single frequency network (MBSFN) cell.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Due to the increasing amount of users that stream broadcast video content, wireless communication systems (e.g., non-legacy wireless communication systems) may include standalone MBSFN cells. Standalone MBSFN cells may provide an improved user experience (e.g., increased quality of MBSFN services) for an individual with a non-legacy user equipment (UE) because the bandwidth of a standalone MBSFN cell is mostly allocated to broadcasting streaming services. However, a legacy UE (e.g., an older version UE) may be able to detect cell acquisition information associated with a standalone MBSFN cell but not to actually acquire standalone MBSFN cells. Thus, legacy UEs may waste time and battery power trying to acquire a detected standalone MBSFN cell.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Due to the increasing amount of users that stream broadcast video content, wireless communication systems (e.g., non-legacy wireless communication systems) may include standalone MBSFN cells. Standalone MBSFN cells may provide an improved user experience for an individual with a non-legacy user equipment (UE) because the bandwidth of a standalone MBSFN cell is mostly allocated to broadcasting streaming services. However, a legacy UE (e.g., an older version UE) may be able to detect cell acquisition information associated with a standalone MBSFN cell but not be able to acquire standalone MBSFN cells. Thus, legacy UEs may waste time and battery power trying to acquire a detected standalone MBSFN cell.

In order to solve the problem, the present disclosure provides various UE avoidance schemes that enable non-legacy UEs to acquire a standalone MBSFN cell and prevent legacy UEs from trying to acquire a standalone MBSFN only cell.

In an aspect of the disclosure, a method, a computer-readable medium, and an apparatus are provided. In one configuration, the apparatus may receive cell acquisition information associated with an enhanced multicast Broadcast service (eMBMS) standalone cell. The apparatus may detect a UE avoidance scheme based on a characteristic associated with the cell acquisition information. The apparatus may perform cell acquisition with the eMBMS standalone cell based on the characteristic.

In another configuration, the apparatus may detect a cell type as part of a mobile alert service cell camping procedure. In an aspect, the cell type may be one of a suitable cell, an acceptable cell, or a notification only cell. In a further aspect, the notification only cell may be associated with an eMBMS standalone service. In another aspect, the apparatus may determine that the cell type is neither the suitable cell, nor the acceptable cell. In a further aspect, the apparatus may camp on the notification only cell based on the determination.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

To the accomplishment of the foregoing and related ends, the one or more aspects comprise the features hereinafter fully described and particularly pointed out in the claims.

The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
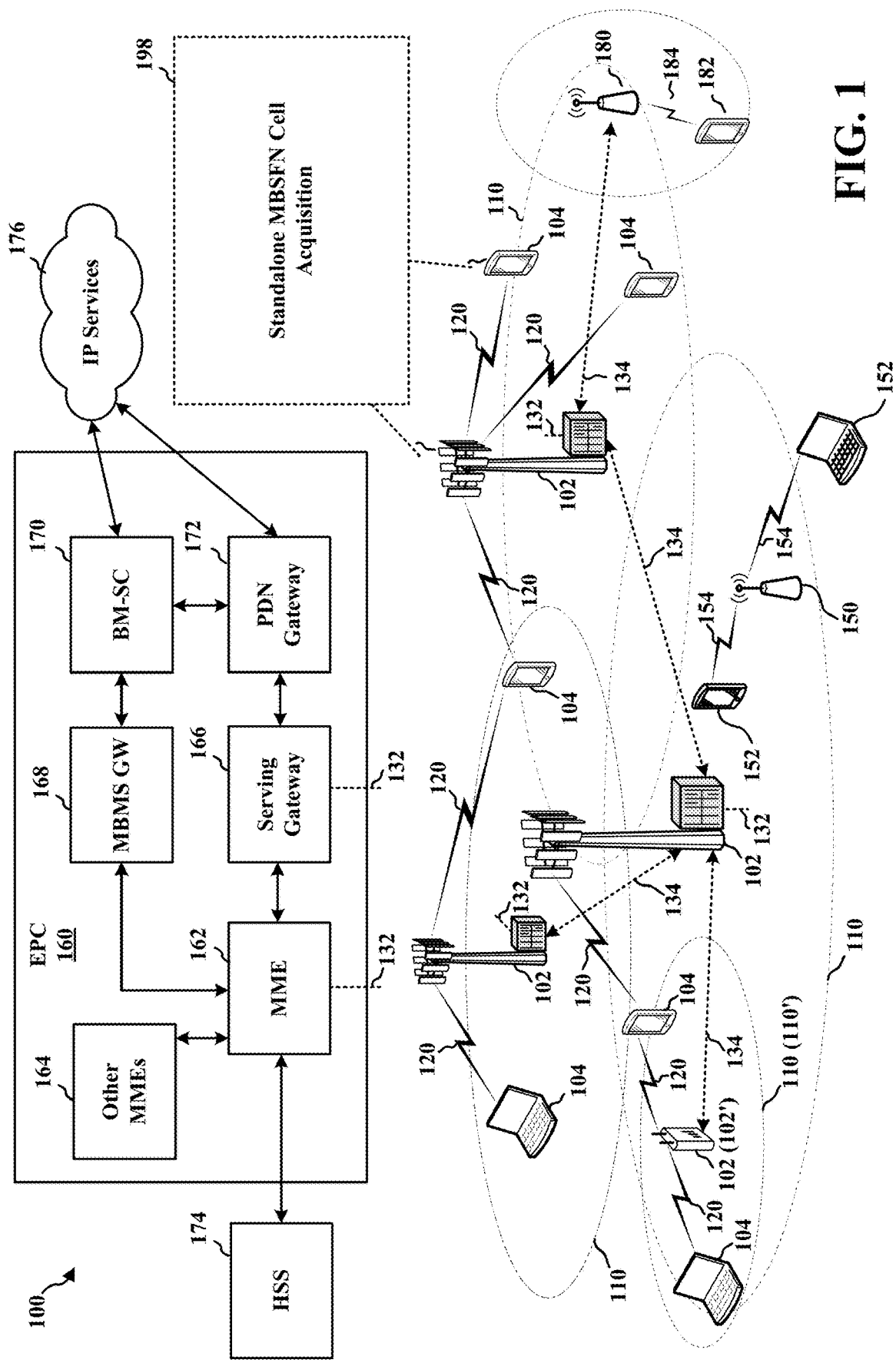
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., 51 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a MBSFN area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to acquire a standalone MBSFN cell (198).

Figure 2:
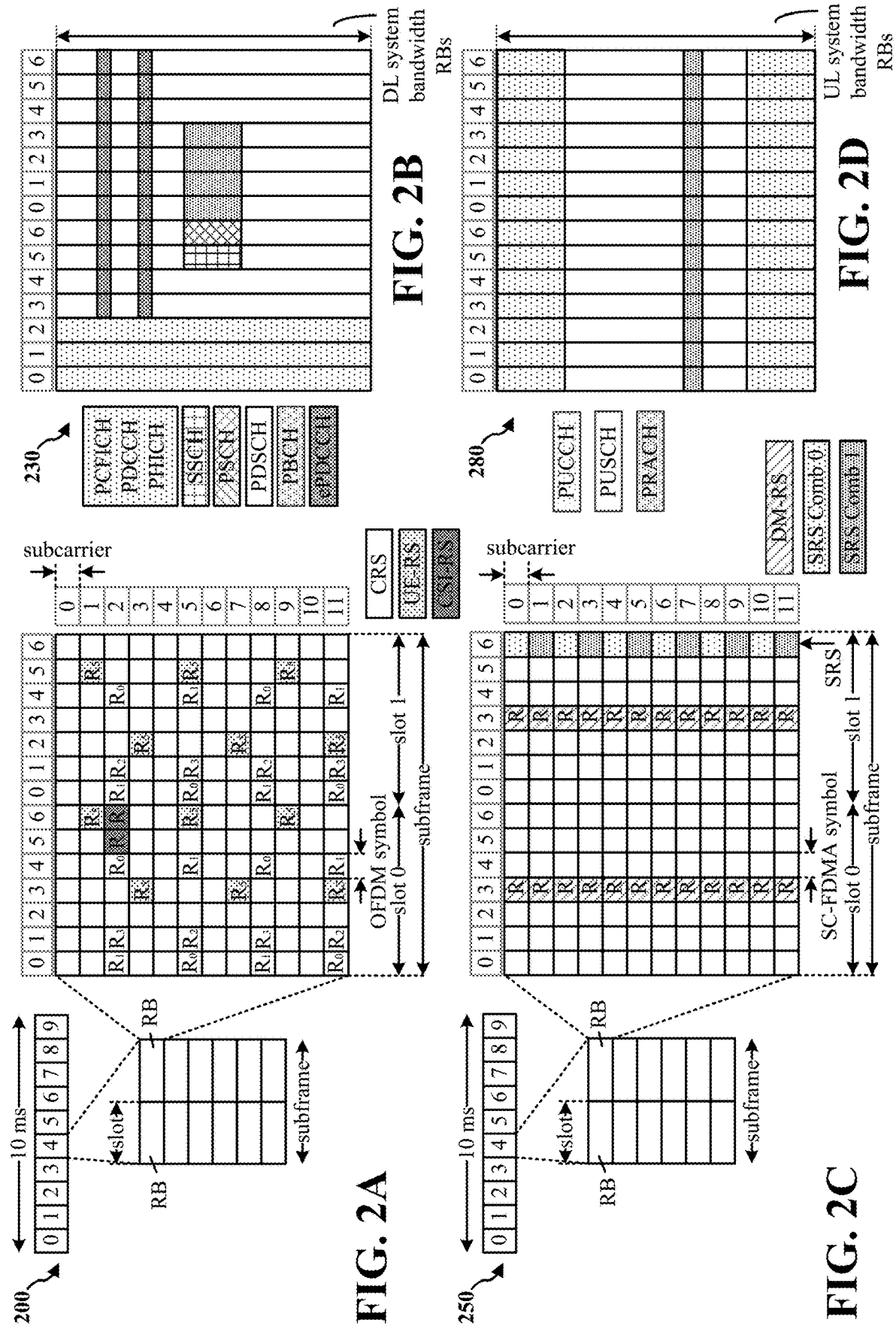
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
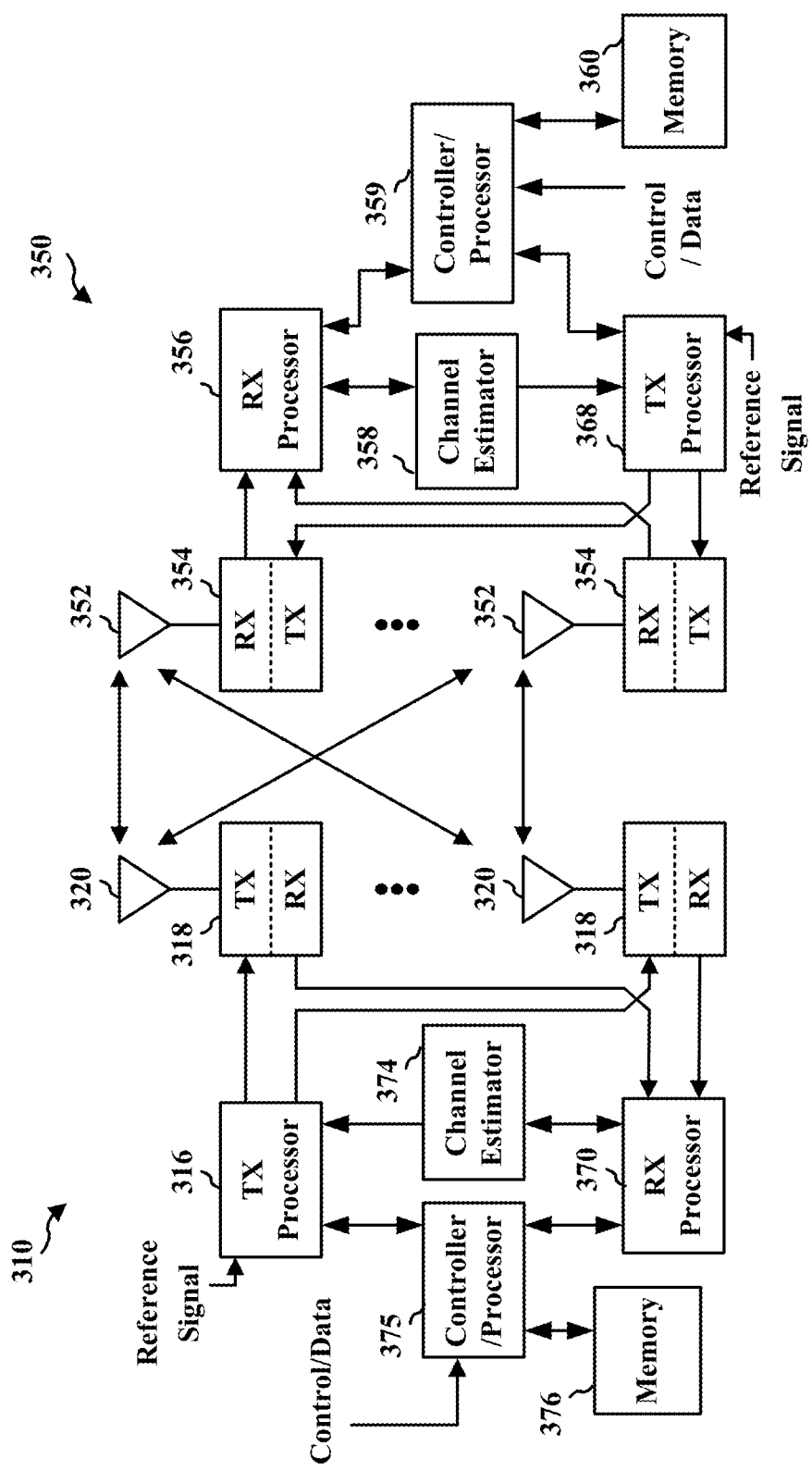
FIG. 3 is a diagram illustrating an example of an evolved Node B (eNB) and UE in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
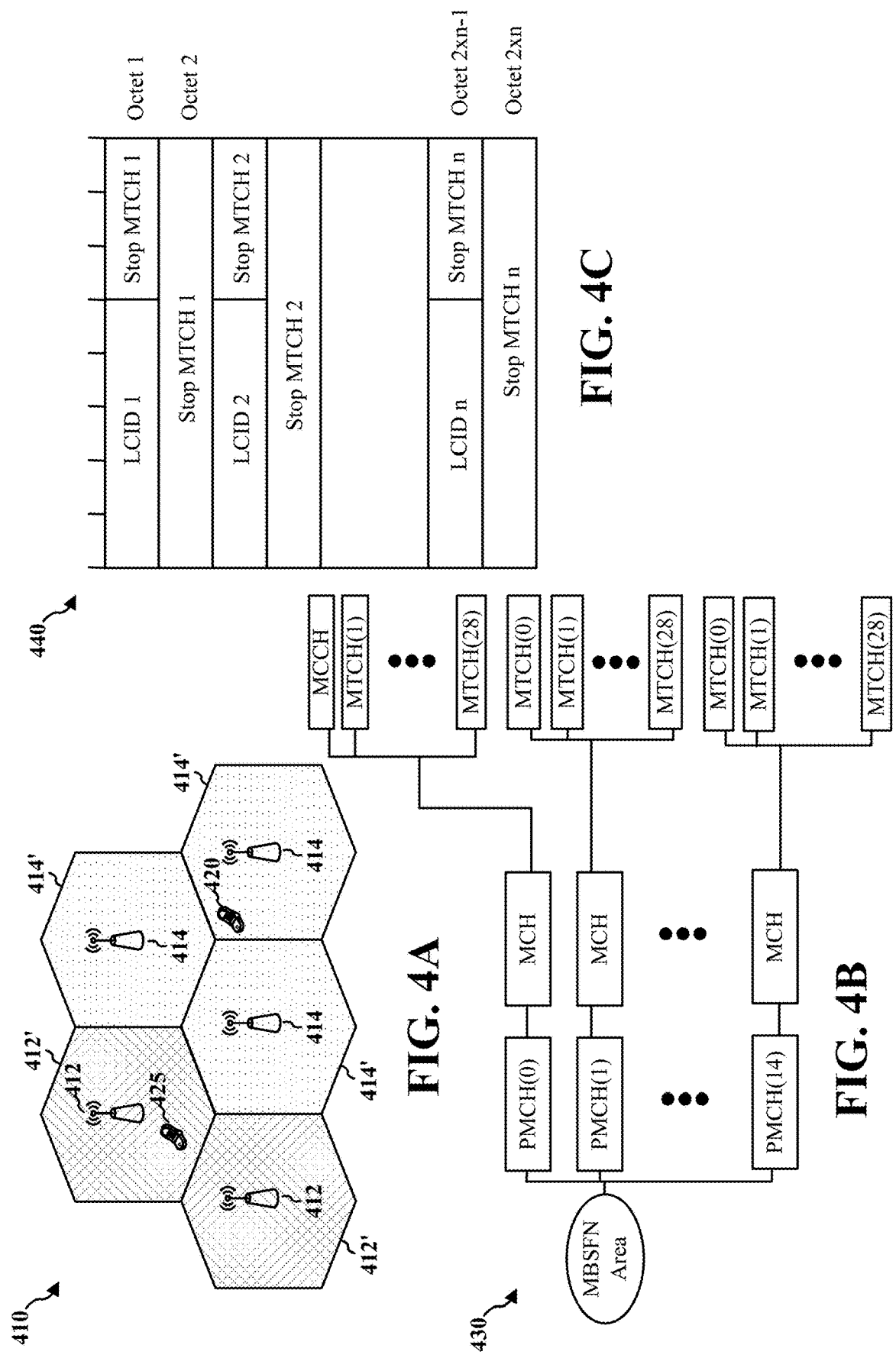
FIG. 4A is a diagram illustrating an example of Multicast Broadcast Single Frequency Network areas in an access network.
FIG. 4B is a diagram illustrating an example of an evolved Multimedia Broadcast Multicast Service channel configuration in a Multicast Broadcast Single Frequency Network.
FIG. 4C is a diagram illustrating a format of a Multicast Channel (MCH) Scheduling Information (MSI) Medium Access Control element.

FIG. 4A is a diagram 410 illustrating an example of MBSFN areas in an access network. The eNBs 412 in cells 412' may form a first MBSFN area and the eNBs 414 in cells 414' may form a second MBSFN area. The eNBs 412, 414 may each be associated with other MBSFN areas, for example, up to a total of eight MBSFN areas. A cell within an MBSFN area may be designated a reserved cell. Reserved cells do not provide multicast/broadcast content, but are time-synchronized to the cells 412', 414' and may have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 4A, the first MBSFN area may support a first eMBMS broadcast service, such as by providing a particular news broadcast to UE 425. The second MBSFN area may support a second eMBMS broadcast service, such as by providing a different news broadcast to UE 420.

FIG. 4B is a diagram 430 illustrating an example of an eMBMS channel configuration in an MBSFN. As shown in FIG. 4B, each MBSFN area supports one or more physical multicast channels (PMCH) (e.g., 15 PMCHs). Each PMCH corresponds to an MCH. Each MCH may multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE may camp on an LTE cell to discover the availability of eMBMS service access and a corresponding access stratum configuration. Initially, the UE may acquire a SIB 13 (SIB13). Subsequently, based on the SIB13, the UE may acquire an MBSFN Area Configuration message on an MCCH. Subsequently, based on the MBSFN Area Configuration message, the UE may acquire an MSI MAC control element. The SIB13 may include (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted. A particular TMGI identifies a particular service of available MBMSs services.

FIG. 4C is a diagram 440 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area. A logical channel identifier (LCID) field (e.g., LCID 1, LCID 2, . . . , LCID n) may indicate a logical channel identifier of the MTCH. A Stop MTCH field (e.g., Stop MTCH 1, Stop MTCH 2, . . . , Stop MTCH n) may indicate the last subframe carrying the MTCH corresponding to the particular LCID.

Due to the increasing number of users that stream broadcast video content, wireless communication systems (e.g., non-legacy wireless communication systems) may now include standalone MBSFN cells. Standalone MBSFN cells may provide an improved user experience for an individual with a non-legacy UE because the bandwidth of the standalone MBSFN cell is mostly allocated to broadcasting streaming services. However, an individual with a legacy UE (e.g., an older version UE) may be able to detect cell acquisition information associated with a standalone MBSFN cell but not be able to acquire standalone MBSFN cells. Thus, legacy UEs may waste time and battery power trying to acquire a detected MBSFN cell that the legacy UE is not equipped to communicate with.

In order to address the problem, the present disclosure provides various UE avoidance schemes that enable non-legacy UEs to acquire a standalone MBSFN cell and prevent legacy UEs from trying to acquire a standalone MBSFN cell.

Figure 5:
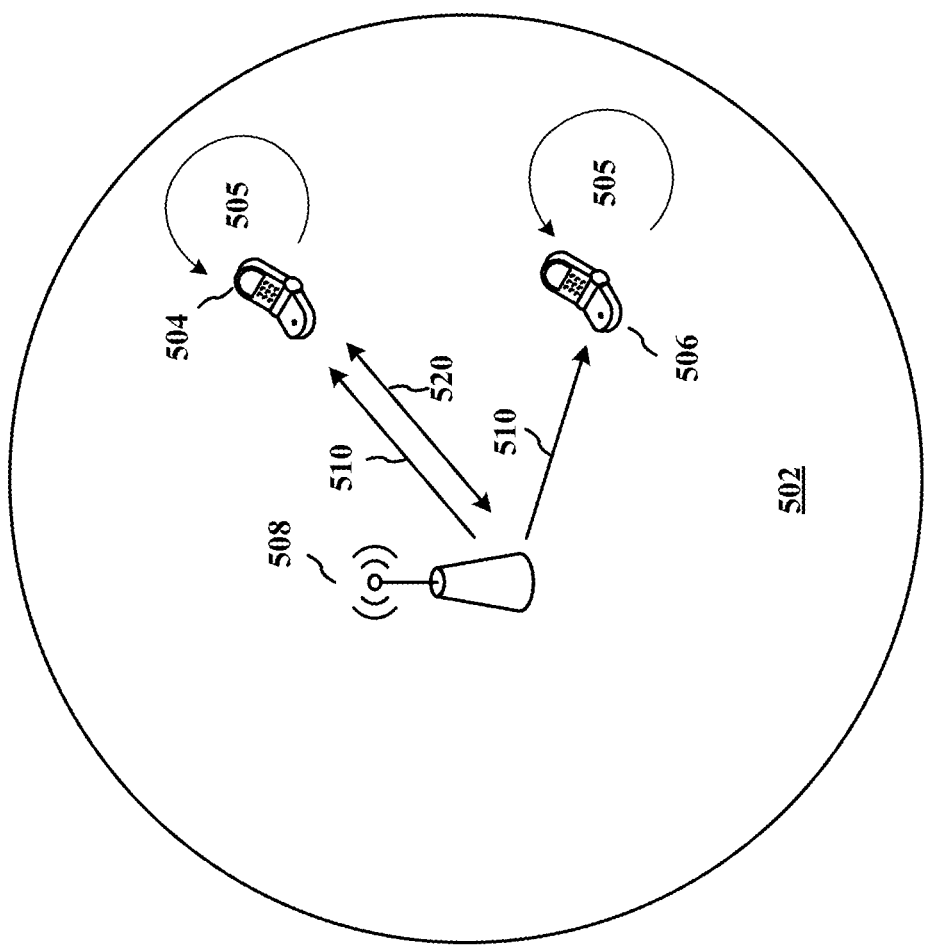
FIG. 5 is a diagram of a wireless communication system in accordance with an aspect of the present disclosure.

FIG. 5 is a diagram of an exemplary communication system 500 that may enable non-legacy UEs to acquire a standalone MBSFN cell and prevent legacy UEs from trying to acquire a standalone MBSFN only cell. The communication system 500 may include a standalone MBSFN cell 502, a non-legacy UE 504 (e.g., a UE equipped to acquire the standalone MBSFN cell 502), a legacy UE 506 (e.g., a UE not equipped to acquire the standalone MBSFN cell 502), and a base station 508. In one aspect, the standalone MBSFN cell 502 may be an eMBMS standalone cell.

As illustrated in FIG. 5, the base station 508 may transmit and/or broadcast cell acquisition information 510 associated with the standalone MBSFN cell 502 (e.g., eMBMS standalone cell). The cell acquisition information 510 may be received by both the non-legacy UE 504 and the legacy UE 506. In a first configuration, the cell acquisition information 510 may be transmitted by the base station 508 in a discovery subframe (e.g., using unicast mode). A discovery subframe including the cell acquisition information 510 may be transmitted once every time period (e.g., 80 ms). In certain configurations, the discovery subframe may include at least one of a PSS, an SSS, a PBCH, a CRS, a SIB, or a MIB. In other words, the discovery subframe may be very similar to a normal cell subframe 0. For example, base station 508 may transmit PSS/SSS/PBCH or PDSCH and system information (e.g., cell acquisition information 510) in non-MBSFN subframes. In an aspect, the non-MBSFN subframes may be transmitted with a subcarrier spacing of $\Delta f = 15$ kHz (e.g., each subcarrier in the non-MBSFN subframes may have a 15 kHz bandwidth). In a second configuration, the cell acquisition information 510 may be included in a synchronization channel that is received by the non-legacy UE 504 and/or legacy UE 506 in a single frequency network (SFN) broadcast mode.

Each of the non-legacy UE 504 and the legacy UE 506 may detect a UE avoidance scheme based on a characteristic 505 associated with the cell acquisition information 510. The legacy UE 506 may not recognize the characteristic 505 and thus stop the cell acquisition/search procedure for standalone MBSFN cell 502. However, the characteristic 505 may be recognized by the non-legacy UE 504. When the characteristic 505 is detected and/or recognized by the non-legacy UE 504, the non-legacy UE 504 may perform cell acquisition 520 with the base station 508 of the standalone MBSFN cell 502.

In the first example embodiment, when the cell acquisition information 510 is transmitted by the base station 508 in a discovery subframe, the characteristic 505 may include at least one of a modified PSS sequence that is not recognized by the legacy UE 506, a modified SSS sequence that is not recognized by the legacy UE 506, a modified separation between the PSS and the SSS that is not recognized by the legacy UE 506, a modified PBCH payload size that is not recognized by the legacy UE 506, a modified PBCH scrambling sequence that is not recognized by legacy UE 506, a modified MIB scrambling sequence that is not recognized by the legacy UE 506, and/or a modified bandwidth value that is not recognized by the legacy UE 506. The modified characteristics listed supra may act as a UE avoidance scheme because the modified characteristics may cause the legacy UE 506 to skip the cell acquisition procedure. However, each of the modified characteristics listed supra may be recognized by the non-legacy UE 504, and the non-legacy UE 504 may perform cell acquisition of the standalone MBSFN cell 502 based on one or more of the characteristics.

For example, when the characteristic 505 includes a modified PBCH scrambling sequence, the modified PBCH scrambling sequence may act as a UE avoidance scheme because the modified characteristics may not be recognizable by the legacy UE 506. When the modified PBCH scrambling sequence is not recognizable by the legacy UE 506, the legacy UE 506 may skip the cell acquisition procedure. In one configuration, the PBCH scrambling sequence may be initialized with $c_{init} = 2^9 + N_{ID}^{cell}$ in each radio frame fulfilling $n_f \bmod 16 = 0$. For example, $c_{init}$ may be the initialization of the scrambling sequence, $N_{ID}^{cell}$ may be the physical cell ID (e.g., obtained from the PSS and/or SSS), and $n_f$ may be the radio frame number. In addition, $n_f \bmod 16$ may indicate that the scrambling sequence is initialized every 16 radio frames. However, the modified PBCH scrambling sequence may be recognized by the non-legacy UE 504, and thus the non-legacy UE 504 may perform cell acquisition of the standalone MBSFN cell 502 based on the modified PBCH scrambling sequence.

In legacy communication systems, cell acquisition information may include one of a number of n different bandwidth values for legacy cells (e.g., n6, n15, n25, n50, n75, n100 each of three bits with two reserved values). By introducing a modified bandwidth value for standalone MBSFN cells (e.g., nMBSFN), the legacy UE 506 may stop the cell search because the nMBSFN bandwidth value transmitted by base station 508 is not recognized by the legacy UE 506. Alternatively, the non-legacy UE 504 may interpret the nMBSFN value as a bandwidth value of a standalone MBSFN cell (e.g., cell 502) and acquire the standalone MBSFN cell 502 based on the nMBSFN bandwidth value. In one aspect, the bandwidth value may be transmitted by base station 508 using a configuration field of the PHICH or by using spare bits.

In a second example embodiment, the cell acquisition information 510 (e.g., MIB and/or SIB) may be transmitted by the base station 508 in a single frequency broadcast mode that may support different cyclic prefix lengths (e.g., 33 μs, 66 μs, 200 μs).

In a first aspect of the second example embodiment, the characteristic 505 may include at least one of a modified PSS sequence or a modified SSS sequence. In the first aspect, the non-legacy UE 504 may perform cell acquisition by detecting at least one of the modified PSS sequence or the modified SSS sequence, and determining a cyclic prefix length associated with the cell acquisition information.

In a second aspect of the second example embodiment, the characteristic 505 may include at least one of a PSS sequence with a fixed cyclic prefix length or a modified SSS sequence with a fixed cyclic prefix length. For example, the synchronization and/or broadcast channel may be transmitted by base station 508 using a common cyclic prefix. In the second aspect, the non-legacy UE 504 may perform cell acquisition by detecting one of the PSS sequence with the fixed cyclic prefix length or the SSS sequence with the fixed cyclic prefix length, and blindly decode the other one of the PSS sequence or the SSS sequence based on different cyclic prefix lengths. For example, if the PSS transmitted by the base station 508 has a constant length (e.g., 200 μs), then the non-legacy UE 504 may blindly decode the SSS transmitted by the base station 508 using different cyclic prefix lengths. Alternatively, the SSS may be transmitted by the base station 508 with the same cyclic prefix length as the PSS, and may include information about the cyclic prefix length.

In a third aspect of the second example embodiment, the characteristic 505 may include at least one of a PSS sequence with a fixed symbol duration or an SSS sequence with a fixed symbol duration. For example, if the symbol duration of the PSS or SSS transmitted by the base station 508 is the same and the cyclic prefix is different, the same PSS or SSS sequence may be transmitted regardless of the cyclic prefix. In the third aspect, the non-legacy UE 504 may perform cell acquisition by blindly detecting a cyclic prefix length based on the fixed symbol duration of the PSS sequence or the fixed symbol duration of the SSS sequence.

Based on the forgoing, the communication system 500 illustrated in FIG. 5 may provide a solution to the problem discussed supra by enabling non-legacy UEs to acquire a standalone MBSFN cell and preventing legacy UEs from wasting time/battery power trying to acquire a standalone MBSFN only cell.

Figure 6:
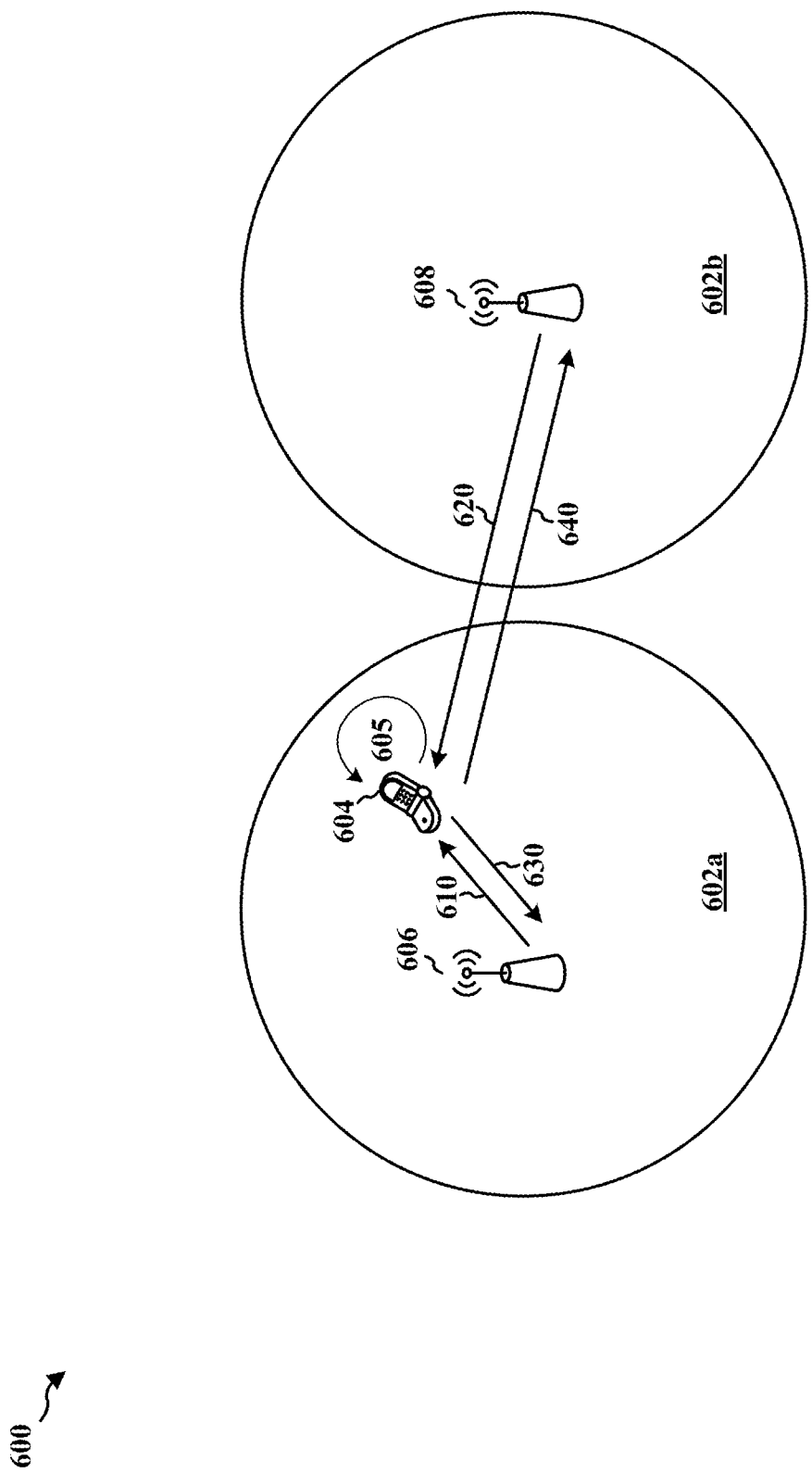
FIG. 6 is a diagram of a wireless communication system in accordance with an aspect of the present disclosure.

FIG. 6 is a diagram of an exemplary communication system 600 that includes a notification only cell. For example, the communication system 600 may include a UE 604 and a serving base station 606 located in a serving cell 602*a*. In addition, the communication system 600 may include a neighbor cell 602*b* that includes a neighbor base station 608.

In one aspect, the serving cell 602*a* may include one of a suitable cell, an acceptable cell, or a notification only cell. A suitable cell, for example, may be a cell in which UE 604 may obtain normal service (e.g., data services and/or voice services). An acceptable cell, for example, may be a cell in which UE 604 may obtain mobile alert messages and initiate emergency calls. A notification only cell, for example, may be a standalone MBSFN cell (e.g., eMBMS standalone cell) in which the UE 604 may obtain mobile alert messages and eMBMS services only. In one aspect, a mobile alert message may include one or more of Earthquake and Tsunami Warning System (ETWS) messages and/or Commercial Mobile Alert System (CMAS) messages.

Referring to FIG. 6, the UE 604 may receive information 610, 620 from each the serving base station 606 and the neighbor base station 608, respectively. The UE 604 may detect a cell type 605 of each of the serving cell 602*a* and the neighbor cell 602*b* based on the received information 610, 620. In one aspect, the cell type may be detected as part of a mobile alert service cell camping procedure performed by the UE 604. For example, the detected cell type may be one of a suitable cell, an acceptable cell, or a notification only cell. If serving cell 602*a* is a notification only cell, the UE 604 may camp on serving cell 602*a* if neighbor cell 602*b* is neither a suitable cell nor an acceptable cell.

In a first example embodiment in which both the serving cell 602*a* and the neighbor cell 602*b* are notification only cells, the UE 604 may reselect 605 from the serving cell 602*a* to the neighbor cell 602*b* based on notification only cell reselection procedures discussed infra.

In a first aspect of the first example embodiment, the neighbor cell 602*b* may transmit and/or broadcast unicast subframes from one or more transmission points (e.g., neighbor base station 608 and at least one other transmission point not illustrated in FIG. 6) within neighbor cell 602*b* that include at least one CRS that are detected by the UE 604. The UE 604 may measure a quality 605 of the neighbor cell 602*b* based on the at least one CRS detected in the unicast subframe 620 received from the neighbor base station 608 and any other transmission point(s) within the neighbor cell 602*b*. Based on the measured quality of the cell, the UE 604 may choose to reselect 605 from the serving cell 602*a* to the neighbor cell 602*b* when the quality of the neighbor cell 602*b* is greater than or equal to a predetermined amount.

In a second aspect of the first example embodiment, neighbor cell 602*b* may transmit and/or broadcast single frequency network subframes that include at least one reference signal (e.g., MBSFN reference signal (MBSFN-RS)) from one or more transmission points (e.g., neighbor base station 608 and at least one other transmission point not illustrated in FIG. 6) within neighbor cell 602*b*. The UE 604 may measure a quality 605 of the neighbor cell 602*b* cell based on the at least one reference signal detected in the single frequency network subframe 620 from the neighbor base station 608 and any other transmission point(s) within the neighbor cell 602*b*. For example, the quality of the cell may include at least one of a reference signal received power (RSRP) or a reference signal received quality (RSRQ). Based on the measured quality of the neighbor cell 602*b*, the UE 604 may choose to reselect 605 from the serving cell 602*a* to the neighbor cell 602*b* when the quality of the neighbor cell 602*b* is greater than or equal to a predetermined amount. Additional details of cell reselection while camping on a notification only cell are discussed infra with respect to FIG. 7.

In a second example embodiment, while camped on a notification only cell (e.g., serving cell 602a), the UE 604 may monitor 605 unicast paging for a mobile alert 610 transmitted and/or broadcast by the serving base station 606. The UE 604 may receive a SIB 610 associated with the mobile alert 610 in a unicast subframe or a MBSFN subframe. In addition, the mobile alert 610 may be received in the unicast subframe or the MBSFN subframe.

In a third example embodiment, the UE 604 may receive the mobile alert 610 in a PMCH in one or more MBSFN subframes transmitted and/or broadcast by the serving base station 606.

In a fourth example embodiment, the UE 604 may receive a list 610 of one or more MBSFN services available in a region of the serving cell 602a (e.g., a notification only cell). For example, the region may include at least one of the serving cell 602a and/or one or more neighboring cells (e.g., neighbor cell 602b) that provide additional MBSFN services. In an aspect, the list 610 may include information associated with at least one MBSFN channel, at least one MBSFN cell, cyclic prefix length, bandwidth, a cell identification, co-location, or supported services.

In a fifth example embodiment, the serving cell 602a may transmit and/or broadcast some subframes that have a control region (e.g., PDCCH) and other subframes that may not include a control region. The serving base station 606 may signal 610 to the UE 604 which subframes have a control region and which do not. In addition, the serving base station 606 may signal the cyclic prefix (CP) and/or numerology associated with each subframe. For example, the UE 604 may receive first signaling 610 that indicates first subframes that include control information and second subframes that do not include the control information. In addition, the UE 604 may receive second signaling 610 that indicates at least one of symbol length or a control region size associated with each subframe. For example, the UE 604 may determine 605 at least one of a specific cyclic prefix length or numerology associated with each subframe based on one or more of the symbol length or the control region size. In another aspect, the UE 604 may receive third signaling 610 that indicates at least one of a cyclic prefix length or numerology associated with each subframe. For example, the serving base station 606 may use a certain number of bits (e.g., 1 bit) to indicate the cyclic prefix length, symbol length, and/or numerology associated with each of the subframes in the first signaling, the second signaling, and the third signaling.

For example, Table 1 below illustrates an example of the information provided in the first signaling and the second signaling.

TABLE 1

| Bit Value | $2^{nd}$ signaling = 0 (Short CP) | $2^{nd}$ signaling = 1 (long CP) |
|---|---|---|
| $1^{st}$ signaling = 0 (No control) | CP length = 33 µs CP, data = 133 µs. 6 symbols per subframe | CP length = 200 µs. Data = 800 µs. Single symbol per subframe |
| $1^{st}$ signaling = 1 (Presence of control) | CP length = 33 µs, data = 133 µs. 5 symbols per subframe. | CP length = 128 µs, data = 800 µs. Single symbol per subframe |

In addition, the first signaling and the third signaling may be merged. By merging the first signaling and the third signaling, information may be provided that indicates no control symbols, 1 OFDM symbol of control information, or 2 OFDM symbols of control information. Table 2 below illustrates an example of the information provided in a merging of the first signaling and the third signaling.

TABLE 2

0: No Control
1: 1 OFDM symbol of control
2: 2 OFDM symbols of control

In addition, the determination of cyclic prefix, numerology, and/or symbol length may be different for subframes with control information and subframes without control information. Moreover, the determination of cyclic prefix, numerology, and/or symbol length may be different depending on whether the control OFDM region uses normal cyclic prefix (NCP) or extended cyclic prefix (ECP) numerology. For example, 200 µs cyclic prefix may be only available for control-less subframes. However, when NCP numerology is used with 1 OFDM symbol of control, the cyclic prefix may be reduced by the length of the first OFDM symbol (2048+160 Ts=71.91 µs).

Base on the forgoing, the present disclosure provides a notification only cell that provides eMBMS services and a cell reselection procedure for a notification only cell.

Figure 7:
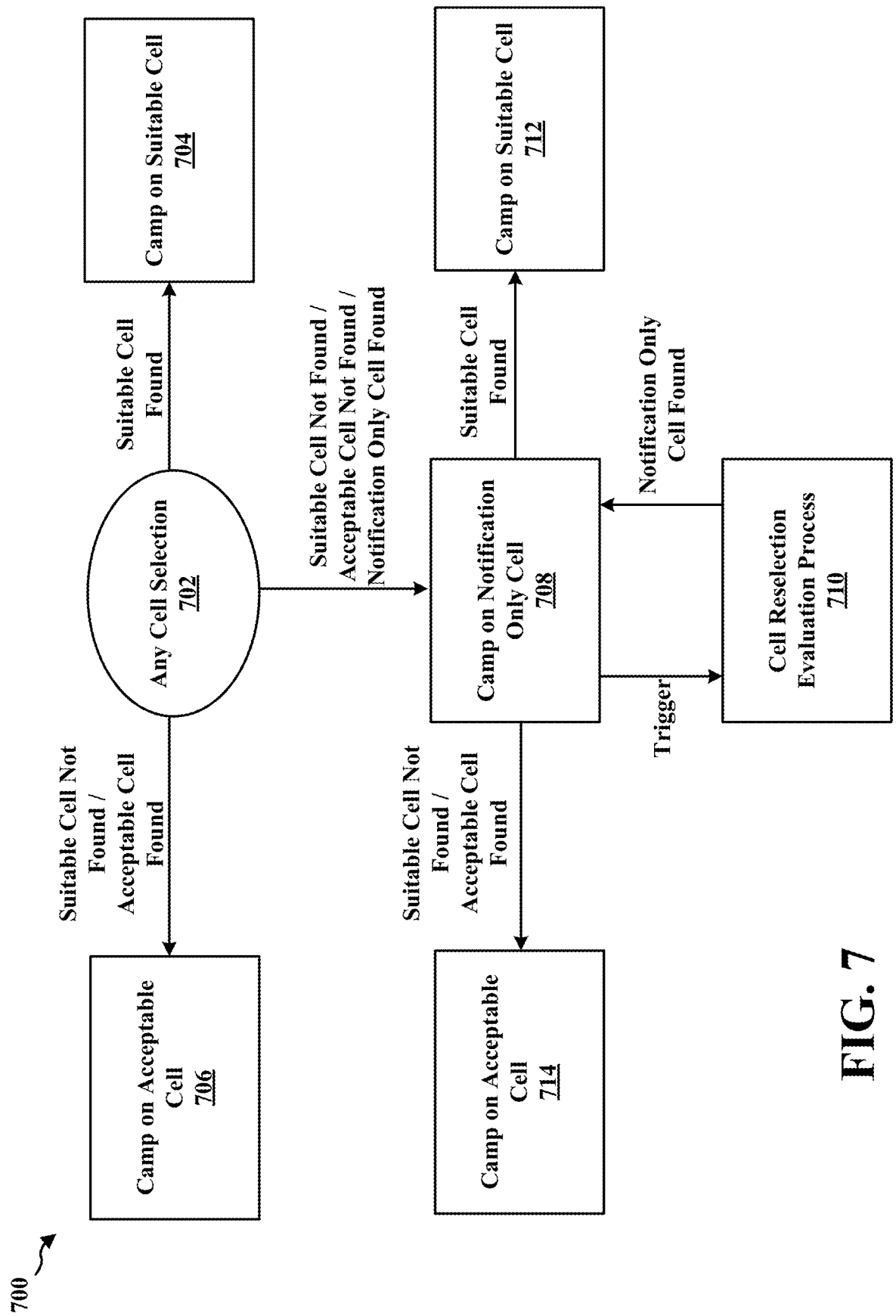
FIG. 7 is a flowchart of a method of wireless communication in accordance with an aspect of the present disclosure.

FIG. 7 is a flow diagram 700 for a notification only cell reselection procedure performed by a UE (e.g., UE 104, 350, 604, apparatus 1202/1202').

At 702, the UE may perform cell selection of a cell (e.g., based on a hierarchy of cell types). For example, camping on a suitable cell may have the highest priority camping on an acceptable cell may have next highest priority over a notification only cell, and camping on a notification cell may be selected if there is neither a suitable cell nor an acceptable cell.

For example, if a suitable cell is found, then at 704 the UE may camp on the suitable cell. If a suitable cell is not found but an acceptable cell is found, then at 706 the UE may camp on the acceptable cell. However, if neither a suitable cell nor an acceptable cell is found, then at 708 the UE may camp on a notification only cell.

At 710, while the UE is camped on the notification only cell, a cell reselection evaluation process 710 may be triggered. If during the cell reselection evaluation process a suitable cell is found, then at 712 the UE reselects (e.g., performs a cell reselection procedure) to camp on the suitable cell. If during the cell reselection evaluation process a suitable cell is not found but an acceptable cell is found, then at 714 the UE may reselect to camp on the acceptable cell. However, if during the cell reselection evaluation process neither a suitable cell is found nor an acceptable cell is found, then the UE may remain on the notification only cell 708 or reselect to camp on a neighboring notification only cell based on cell quality measurements.

Figure 8:
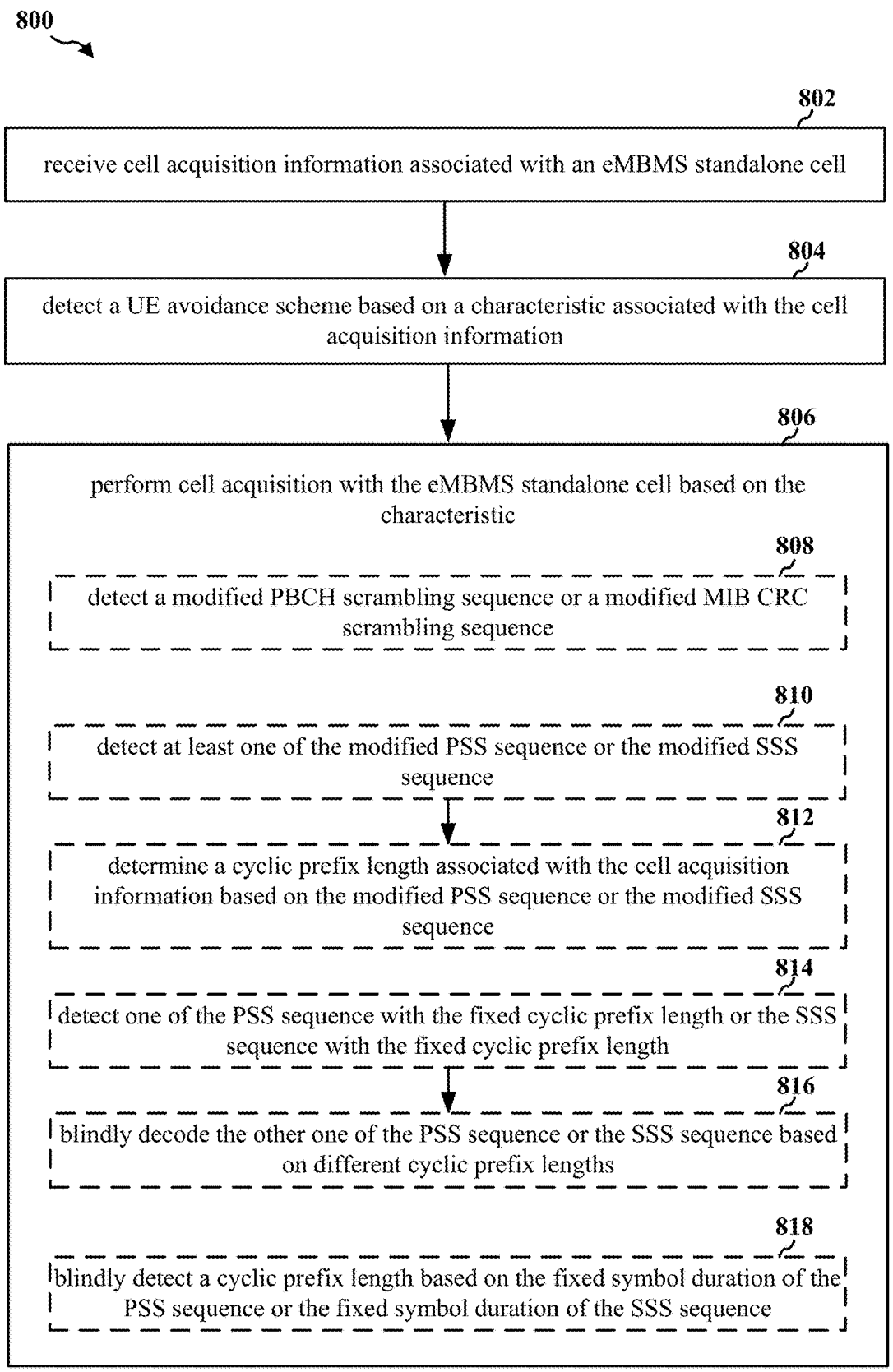
FIG. 8 is a flowchart of a method of wireless communication in accordance with an aspect of the present disclosure.

FIG. 8 is a flow chart 800 of a method of wireless communication in accordance with various aspects. The method may be performed by a UE, such as a non-legacy UE (e.g., 104, 350, 420, 425, 504, apparatus 902/902'). In FIG. 8, operations indicated with dashed lines represent optional operations for various aspects of the disclosure.

At 802, the UE may receive cell acquisition information associated with an eMBMS standalone cell. In one aspect, the cell acquisition information may be included in a discovery subframe that is received in unicast mode. In another aspect, the discovery subframe may include at least one of a PSS, an SSS, a PBCH, a CRS, an SIB, or an MIB. In a further aspect, the cell acquisition information may be included in a synchronization channel that is received in a single frequency network broadcast mode. In a further aspect, the UE may be a non-legacy UE. For example, referring to FIG. 5, the base station 508 may transmit and/or broadcast cell acquisition information 510 associated with the standalone MBSFN cell 502 (e.g., eMBMS standalone cell). The cell acquisition information 510 may be received by both the non-legacy UE 504 and the legacy UE 506. In one aspect, the cell acquisition information 510 may be transmitted by the base station 508 in a discovery subframe (e.g., using unicast mode). For example, a discovery subframe that includes the cell acquisition information 510 may be received by the non-legacy UE 504 and the legacy UE 506 once every time period (e.g., 80 ms). As mentioned supra, the discovery subframe may include at least one of a PSS, an SSS, a PBCH, a CRS, an SIB, or an MIB. In other words, the discovery subframe may be very similar to a normal cell subframe 0. In an alternative aspect mentioned supra, the cell acquisition information 510 may be included in a synchronization channel that is received by the non-legacy UE 504 and/or legacy UE 506 in a single frequency network broadcast mode.

At 804, the UE may detect a UE avoidance scheme based on a characteristic associated with the cell acquisition information. In an aspect, the UE avoidance scheme may be a legacy UE avoidance scheme. In another aspect, the characteristic may include a modified PBCH scrambling sequence. For example, referring to FIG. 5, the non-legacy UE 504 and the legacy UE 506 may detect a UE avoidance scheme based on a characteristic 505 associated with the cell acquisition information 510. The legacy UE 506 may not recognize the characteristic 505 and thus may stop the cell acquisition/search procedure for standalone MBSFN cell 502. For example, if the PBCH scrambling sequence is modified to a new scrambling sequence, the legacy UE 506 may attempt to decode it with the legacy scrambling sequence, which will result in the UE not being able to decode it and stop the acquisition procedure. However, the characteristic 505 may be recognized by the non-legacy UE 504. When the characteristic 505 is detected by the non-legacy UE 504, the non-legacy UE 504 may perform cell acquisition 520 with the base station 508 of the standalone MBSFN cell 502 based on the recognized characteristic 505. In a first example embodiment, when the cell acquisition information 510 is transmitted by the base station 508 in a discovery subframe, the characteristic 505 may include at least one of a modified PSS sequence that is not recognized by the legacy UE 506, a modified SSS sequence that is not recognized by the legacy UE 506, a modified separation between the PSS and the SSS that is not recognized by the legacy UE 506, a modified PBCH payload size that is not recognized by the legacy UE 506, a modified PBCH scrambling sequence that is not recognized by the legacy UE 506, a modified MIB scrambling sequence that is not recognized by the legacy UE 506, and/or a modified bandwidth value that is not recognized by the legacy UE 506. In this way the modified characteristics listed supra may act as a UE avoidance scheme since the modified characteristics will cause the legacy UE 506 to skip the cell acquisition procedure.

At 806, the UE may perform cell acquisition with the eMBMS standalone cell based on the characteristic. For example, referring to FIG. 5, when the characteristic 505 is detected by the non-legacy UE 504, the non-legacy UE 504 may perform cell acquisition 520 with the base station 508 of the standalone MBSFN cell 502 based on the recognized characteristic 505.

At 808, the UE may detect a modified PBCH scrambling sequence or a modified MIB CRC scrambling sequence. For example, referring to FIG. 5, when the cell acquisition information 510 is transmitted by the base station 508 in a discovery subframe, the characteristic 505 may include a modified PBCH scrambling sequence and/or a modified MIB scrambling sequence that is not recognized by the legacy UE 506. In this way, the modified PBCH scrambling sequence and/or the modified MIB scrambling sequence may act as a UE avoidance scheme since the modified characteristics may cause the legacy UE 506 to skip the cell acquisition procedure. However, the modified PBCH scrambling sequence and/or the modified MIB scrambling sequence may be recognized by the non-legacy UE 504, and thus the non-legacy UE 504 may perform cell acquisition of the standalone MBSFN cell 502 based on the modified PBCH scrambling sequence and/or the modified MIB scrambling sequence.

At 810, the UE may detect at least one of the modified PSS sequence or the modified SSS sequence when the characteristic includes a modified PSS sequence or a modified SSS sequence. For example, referring to FIG. 5, the non-legacy UE 504 may perform cell acquisition by detecting at least one of the modified PSS sequence or the modified SSS sequence, and determining a cyclic prefix length associated with the cell acquisition information based on the modified PSS sequence or the modified SSS sequence.

At 812, the UE may determine a cyclic prefix length associated with the cell acquisition information based on the modified PSS sequence or the modified SSS sequence. For example, referring to FIG. 5, when the characteristic 505 is detected by the non-legacy UE 504, the non-legacy UE 504 may perform cell acquisition 520 with the base station 508 of the standalone MBSFN cell 502 based on the recognized characteristic 505. In one example, the separation between PSS and SSS may be different for different cyclic prefix lengths. After detecting the PSS, the UE may attempt to detect the SSS with different separation hypothesis, which are related to different CP lengths.

At 814, the UE may detect one of the PSS sequence with the fixed cyclic prefix length or the SSS sequence with the fixed cyclic prefix length when the characteristic includes a PSS sequence or SSS sequence with a fixed cyclic prefix length. For example, referring to FIG. 5, the characteristic 505 may include at least one of a PSS sequence with a fixed cyclic prefix length or a modified SSS sequence with a fixed cyclic prefix length. For example, the synchronization and/or broadcast channel may be transmitted using a common cyclic prefix. In this second aspect, the non-legacy UE 504 may perform cell acquisition by detecting one of the PSS sequence with the fixed cyclic prefix length or the SSS sequence with the fixed cyclic prefix length, and blindly decode the other one of the PSS sequence or the SSS sequence based on different cyclic prefix lengths. For example, if the PSS transmitted by the base station 508 has a constant length (e.g., 200 μs), then the non-legacy UE 504 may blindly decode the SSS transmitted by the base station 508 for different cyclic prefix lengths.

At 816, the UE may blindly decode the other one of the PSS sequence or the SSS sequence based on different cyclic prefix lengths. For example, referring to FIG. 5, the characteristic 505 may include at least one of a PSS sequence with a fixed cyclic prefix length or a modified SSS sequence with a fixed cyclic prefix length. For example, the synchronization and/or broadcast channel may be transmitted using a common cyclic prefix. In this second aspect, the non-legacy UE 504 may perform cell acquisition by detecting one of the PSS sequence with the fixed cyclic prefix length or the SSS sequence with the fixed cyclic prefix length, and blindly decode the other one of the PSS sequence or the SSS sequence based on different cyclic prefix lengths. For example, if the PSS transmitted by the base station 508 has a constant length (e.g., 200p), then the non-legacy UE 504 may blindly decode the SSS transmitted by the base station 508 for different cyclic prefix lengths.

At 818, the UE may blindly detect a cyclic prefix length based on the fixed symbol duration of the PSS sequence or the fixed symbol duration of the SSS sequence when the characteristic includes a PSS sequence with a fixed symbol duration or an SSS sequence with a fixed symbol duration. For example, referring to FIG. 5, the characteristic 505 may include at least one of a PSS sequence with a fixed symbol duration or an SSS sequence with a fixed symbol duration. For example, if the symbol duration transmitted by the base station 508 is the same and the cyclic prefix is different, the same sequence may be transmitted regardless of the cyclic prefix. In this third aspect, the non-legacy UE 504 may perform cell acquisition by blindly detecting a cyclic prefix length based on the fixed symbol duration of the PSS sequence or the fixed symbol duration of the SSS sequence.

Figure 9:
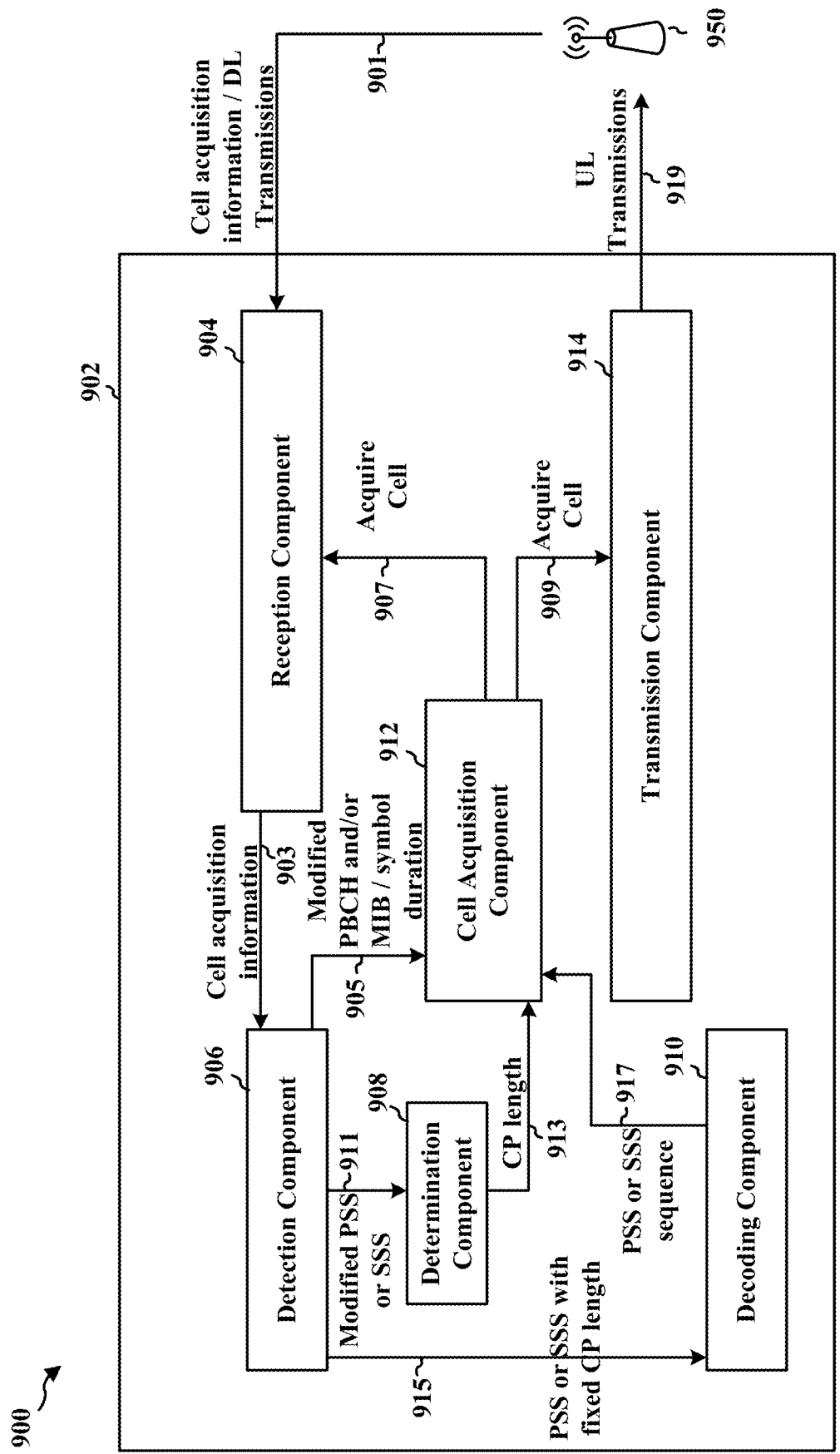
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a UE (e.g., UE 104, 350, 420, 425, 504, 604, the apparatus 902') in communication with a base station 950 (e.g., base station 102, 310, 412, 414, 508, 606, 608) located in an eMBMS standalone cell. Reception component 904 may receive cell acquisition information 901 from base station 950. In one aspect, the cell acquisition information 901 may be included in a discovery subframe that is received in unicast mode. In another aspect, the discovery subframe may include at least one of a PSS, an SSS, a PBCH, a CRS, an SIB, or an MIB. In a further aspect, the cell acquisition information may be included in a synchronization channel that is received in a single frequency network broadcast mode. Reception component 904 may send a signal 903 associated with the cell acquisition information to detection component 906. Detection component 906 may detect a UE avoidance scheme based on a characteristic associated with the information 903 received from the reception component 904. For example, the UE avoidance scheme may be a legacy UE avoidance scheme. In a first example, the characteristic may include a modified PBCH scrambling sequence. Detection component 906 may detect the modified PBCH scrambling sequence, and send a signal 905 associated with the modified PBCH scrambling sequence to cell acquisition component 912. Cell acquisition component 912 may perform cell acquisition with the eMBMS standalone cell based on the modified PBCH scrambling sequence, and send a signal 907, 909 associated with the acquired eMBMS standalone cell to at least one of reception component 904 and/or transmission component 914. In a second example, the characteristic may include a modified PSS and/or modified SSS, and detection component 906 may send a signal 911 associated with the modified PSS and/or the modified SSS to determination component 908. Determination component 908 may determine a CP length associated with the cell acquisition information based on the modified PSS sequence or the modified SSS sequence, and send a signal 913 associated with the determined CP length to cell acquisition component 912. Cell acquisition component 912 may perform cell acquisition with the eMBMS standalone cell based on the determined CP length, and send a signal 907, 909 associated with the acquired eMBMS standalone cell to at least one of reception component 904 and/or transmission component 914. In a third example, the characteristic may include a PSS or SSS with a fixed CP length, and detection component 906 may detect one of the PSS sequence with the fixed CP length or the SSS sequence with the fixed CP length. Detection component 906 may send a signal 915 associated with the PSS or SSS with a fixed CP length to decoding component 910. Decoding component 910 may blindly decode the other one of the PSS sequence or the SSS sequence based on different CP lengths, and send a signal 917 associated with one or more of the PSS sequence or the SSS sequence to cell acquisition component 912. Cell acquisition component 912 may perform cell acquisition with the eMBMS standalone cell based on at least one of the determined PSS sequence and/or SSS sequence, and send a signal 907, 909 associated with the acquired eMBMS standalone cell to at least one of reception component 904 and/or transmission component 914. In a fourth example, the characteristic may include a PSS sequence with a fixed symbol duration or an SSS sequence with a fixed symbol duration. Detection component 906 may detect the PSS sequence with the fixed symbol duration or the SSS sequence with the fixed symbol duration, and send a signal 905 associated with the PSS sequence with the fixed symbol duration or the SSS sequence with the fixed symbol duration to cell acquisition component 912. Cell acquisition component 912 may perform cell acquisition with the eMBMS standalone cell based on the PSS sequence with the fixed symbol duration or the SSS sequence with the fixed symbol duration, and send a signal 907, 909 associated with the acquired eMBMS standalone cell to at least one of reception component 904 and/or transmission component 914. Optionally, that apparatus may include transmission component 914. In the optional configuration, the transmission component 914 may receive a signal 909 associated with performing cell acquisition (e.g., standalone eMBMS cell) from cell acquisition component 912, and may transmit cell acquisition information 919 and/or UL communications 919 to the base station 950 to acquire the cell. Alternatively, the apparatus may be a reception-only apparatus (e.g., an apparatus that includes the reception component 904 but may not include the transmission component 914).

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
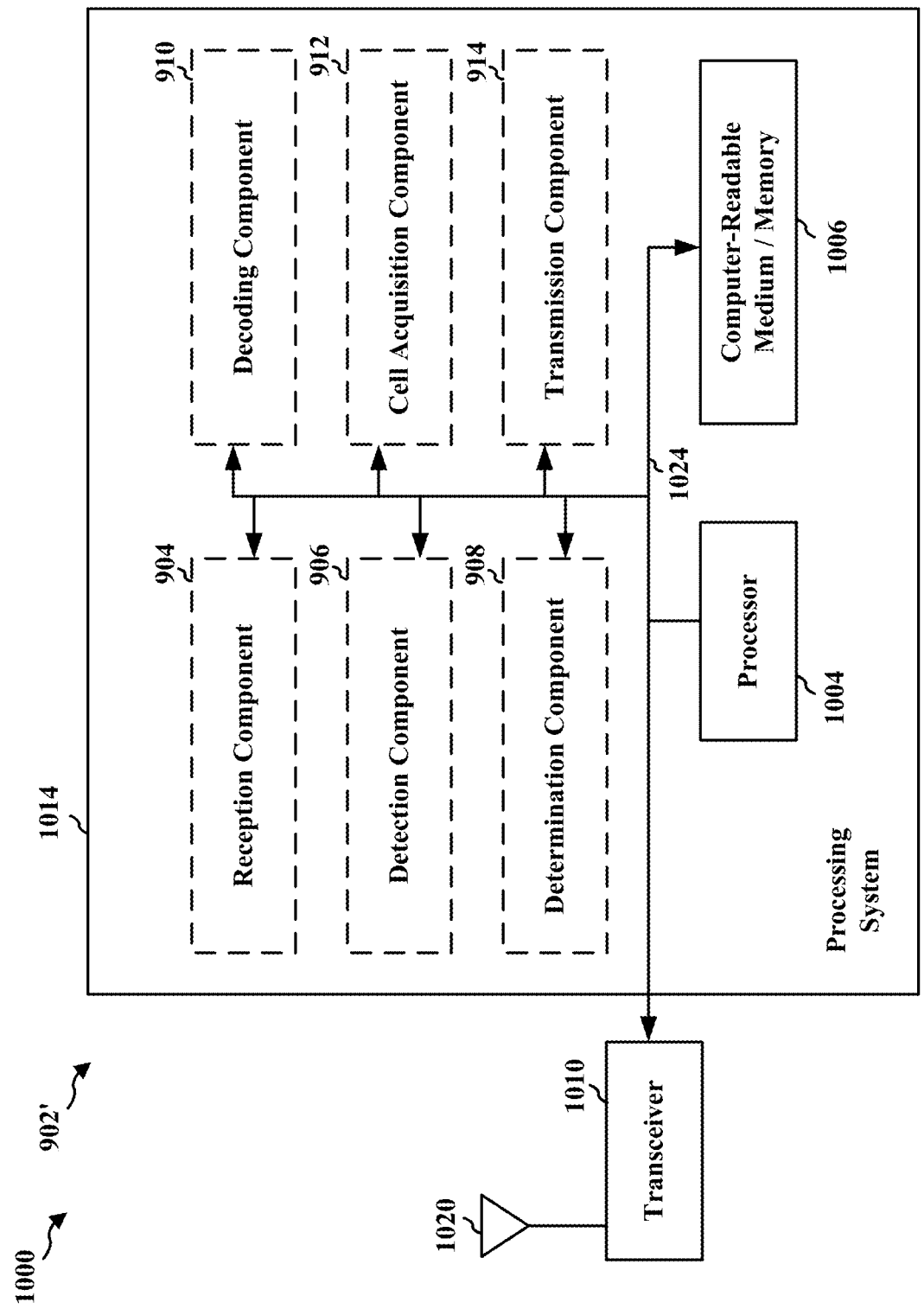
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 914, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912, 914. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication may include means for receiving, by a UE, cell acquisition information associated with an eMBMS standalone cell. In an aspect, the cell acquisition information may be included in a discovery subframe that is received in unicast mode. For example, the discovery subframe may include at least one of a PSS, a SSS, a PBCH, a CRS, an SIB, or an MIB. In another aspect, the cell acquisition information may be included in a synchronization channel that is received in a single frequency network broadcast mode. In another configuration, the apparatus 902/902' for wireless communication may include means for detecting a UE avoidance scheme based on a characteristic associated with the cell acquisition information. In an aspect, the UE may be a non-legacy UE and the UE avoidance scheme is a legacy UE avoidance scheme. In another aspect, the characteristic may include at least one of a modified PSS sequence, a modified SSS sequence, a modified separation between the PSS and the SSS, a modified PBCH payload size, a modified PBCH scrambling sequence, a modified MIB scrambling sequence, a modified bandwidth value, a PSS sequence with a fixed symbol duration, and/or an SSS sequence with a fixed symbol duration. In one aspect, the means for performing the cell acquisition may be configured to detect the modified PBCH scrambling sequence or the modified MIB CRC scrambling sequence. In another aspect, the means for performing the cell acquisition may be configured to detect at least one of the modified PSS sequence or the modified SSS sequence and to determine a cyclic prefix length associated with the cell acquisition information based on the modified PSS sequence or the modified SSS sequence. In a further aspect, the characteristic may include at least one of a PSS sequence with a fixed cyclic prefix length or a SSS sequence with a fixed cyclic prefix length. In one aspect, the means for performing the cell acquisition may be configured to detect one of the PSS sequence with the fixed cyclic prefix length or the SSS sequence with the fixed cyclic prefix length and to blindly decode the other one of the PSS sequence or the SSS sequence based on different cyclic prefix lengths. In another aspect, the means for performing the cell acquisition may be configured to blindly detect a cyclic prefix length based on the fixed symbol duration of the PSS sequence or the fixed symbol duration of the SSS sequence. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11A:
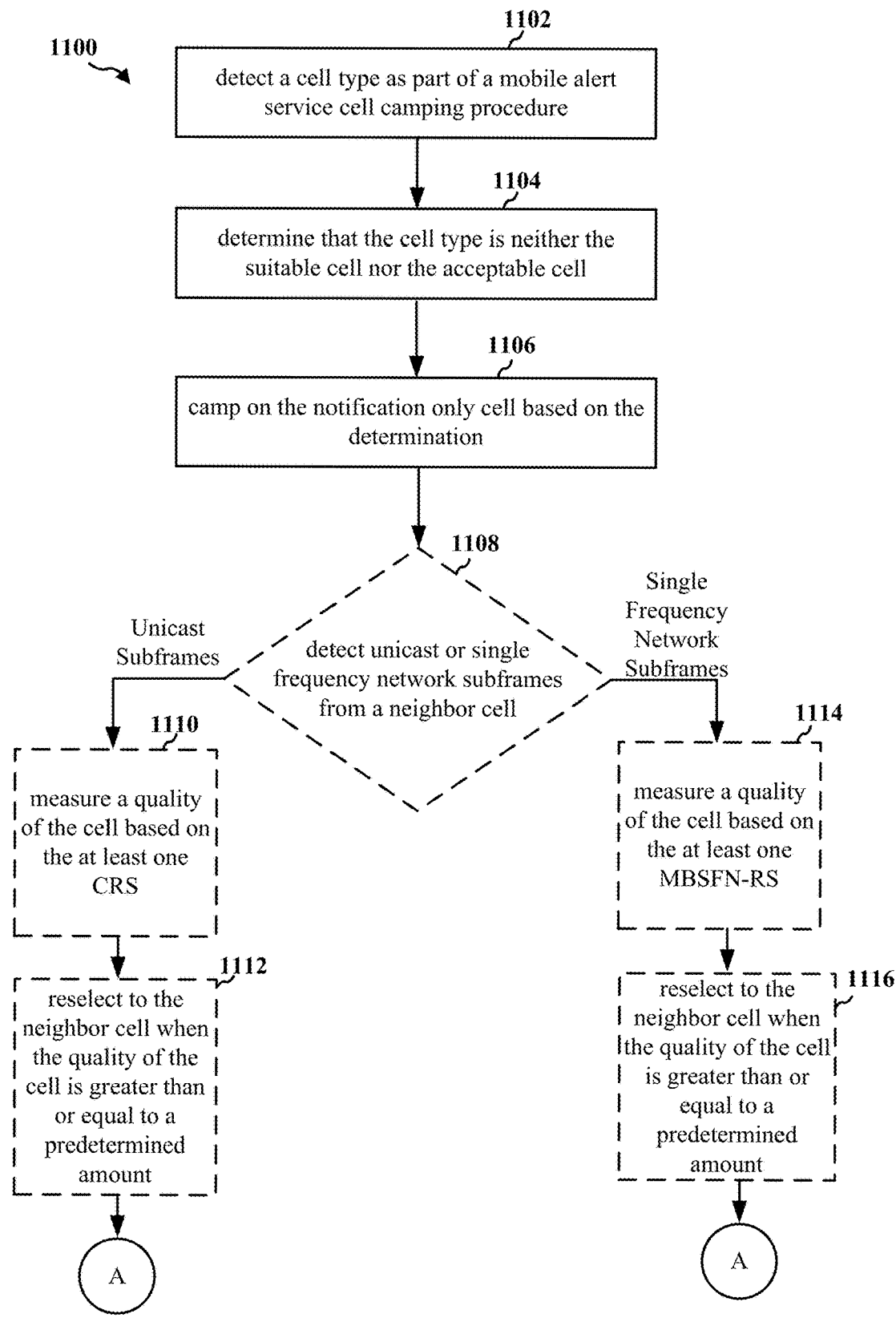
FIGS. 11A and 11B are a flowchart of a method of wireless communication in accordance with an aspect of the present disclosure.
Figure 11B:
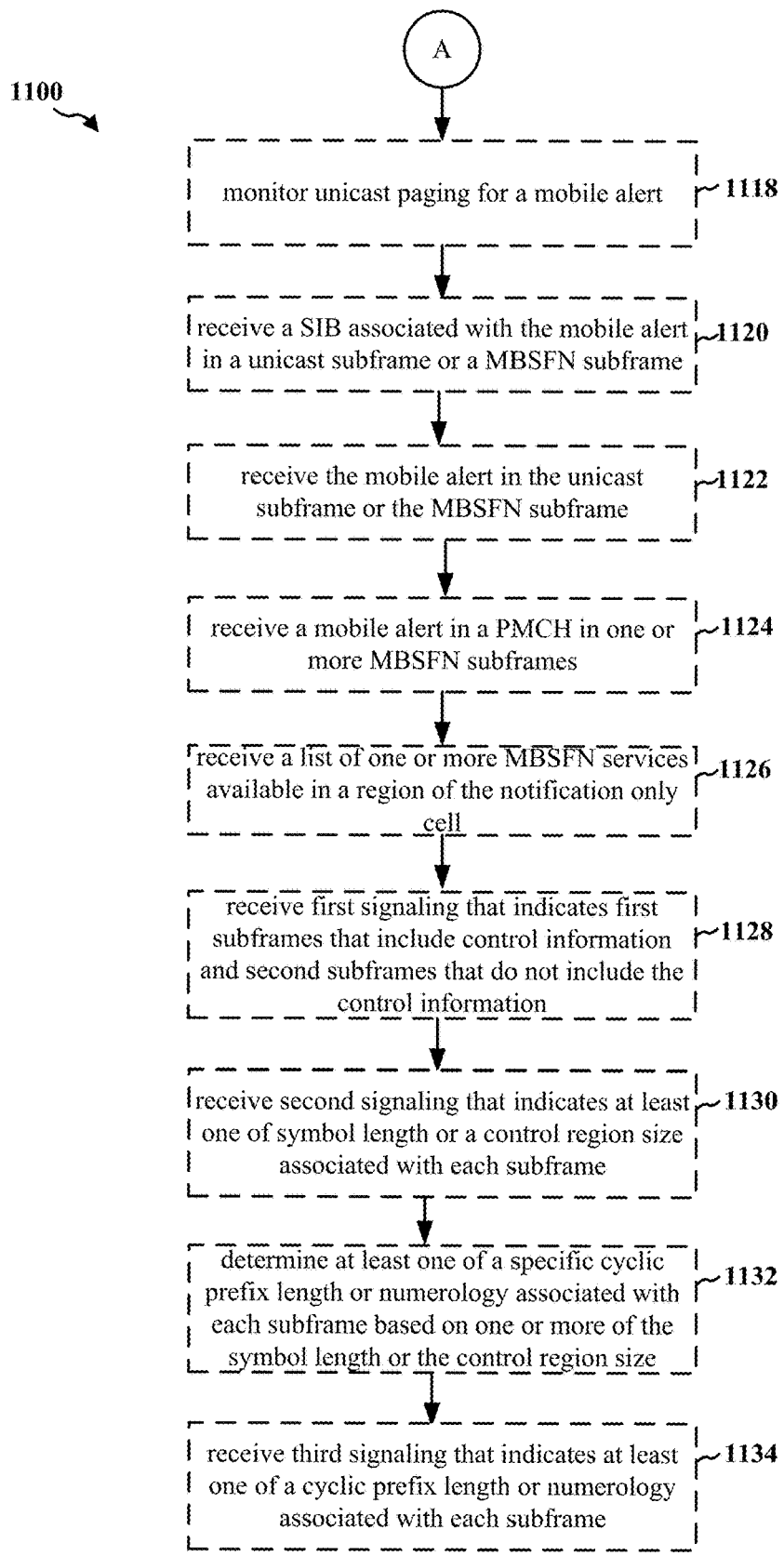

FIGS. 11A and 11B is a flow chart 1100 of a method of wireless communication in accordance with various aspects. The method may be performed by a UE, such as non-legacy UE (e.g., 104, 350, 420, 425, 504, apparatus 1202/1202'). In FIGS. 11A and 11B, operations indicated with dashed lines represent optional operations for various aspects of the disclosure.

In FIG. 11A, at 1102, the UE may detect a cell type as part of a mobile alert service cell camping procedure. In one aspect, the mobile alert service cell camping procedure may include at least one of an ETWS cell camping procedure or a CMAS cell camping procedure. In another aspect, the suitable cell may provide wireless communication services to a user equipment, the acceptable cell provides emergency mobile alerts and emergency calls, and the notification only cell provides emergency mobile alerts and eMBMS services. For example, referring to FIG. 6, the UE 604 may receive information 610, 620 from each the serving base station 606 and the neighbor base station 608, respectively. The UE 604 may detect a cell type 605 of each of the serving cell 602a and the neighbor cell 602b based on the received information 610, 620. In one aspect, the cell type may be detected as part of a mobile alert service cell camping procedure performed by the UE 604. For example, the detected cell type may be one of a suitable cell, an acceptable cell, or a notification only cell. A suitable cell, for example, may be a cell in which UE 604 may obtain normal service (e.g., data services and/or voice services). An acceptable cell, for example, may be a cell in which UE 604 may obtain mobile alert messages and initiate emergency calls. A notification only cell, for example, may be a standalone MBSFN cell (e.g., eMBMS standalone cell) in which the UE 604 may obtain mobile alert messages and eMBMS services only. In one aspect, a mobile alert message may include one or more of ETWS messages and/or CMAS messages.

In FIG. 11A, at 1104, the UE may determine that the cell type is neither the suitable cell nor the acceptable cell. A suitable cell is a cell in which the UE can receive normal service (e.g. receive and/or initiate regular data transmission), which is determined based on the PLMN list broadcast by the cell (if the PLMN of the UE is broadcast by the cell, then this cell is determined to be suitable) and is not barred.

An acceptable cell is a cell in which the UE can only receive limited service (initiate/receive emergency calls and ETWS/CMAS messages). For example, referring to FIG. 6, the UE 604 may receive information 610, 620 from each the serving base station 606 and the neighbor base station 608, respectively. The UE 604 may detect a cell type 605 of each of the serving cell 602a and the neighbor cell 602b based on the received information 610, 620. In one aspect, the cell type may be detected as part of a mobile alert service cell camping procedure performed by the UE 604. For example, the detected cell type may be one of a suitable cell, an acceptable cell, or a notification only cell. If serving cell 602a is a notification only cell, the UE 604 may camp on serving cell 602a if neighbor cell 602b is neither a suitable cell nor an acceptable cell.

In FIG. 11A, at 1106, the UE may camp on the notification only cell based on the determination. For example, referring to FIG. 6, the UE 604 may receive information 610, 620 from each the serving base station 606 and the neighbor base station 608, respectively. The UE 604 may detect a cell type 605 of each of the serving cell 602a and the neighbor cell 602b based on the received information 610, 620. In one aspect, the cell type may be detected as part of a mobile alert service cell camping procedure performed by the UE 604. For example, the detected cell type may be one of a suitable cell, an acceptable cell, or a notification only cell. If serving cell 602a is a notification only cell, the UE 604 may camp on serving cell 602a if neighbor cell 602b is neither a suitable cell nor an acceptable cell.

In FIG. 11A, at 1108, the UE may detect unicast or single frequency network subframes from a neighbor cell. For example, referring to FIG. 6, the neighbor cell 602b may transmit and/or broadcast unicast subframes that include at least one CRS that are detected by the UE 604. Alternatively, the neighbor cell 602b may transmit and/or broadcast single frequency network subframes that include at least one MBSFN-RS.

In FIG. 11A, at 1110, the UE may measure a quality of the cell based on the at least one CRS when the UE detects unicast subframes. For example, referring to FIG. 6, The UE 604 may measure a quality 605 of the neighbor cell 602b based on the at least one CRS detected in the unicast subframe 620 received from the neighbor base station 608.

In FIG. 11A, at 1112, the UE may reselect to the neighbor cell when the quality of the cell is greater than or equal to a predetermined amount. For example, referring to FIG. 6, based on the measured quality of the cell, the UE 604 may choose to reselect 605 from the serving cell 602a to the neighbor cell 602b when the quality of the neighbor cell 602b is greater than or equal to a predetermined amount.

In FIG. 11A, at 1114, the UE may measure a quality of the cell based on the at least one reference signal (e.g., MBSFN-RS, CRS, etc.) when the UE detects single frequency network subframes. For example, referring to FIG. 6, the UE 604 may measure a quality 605 of the neighbor cell 602b cell based on the at least one reference signal detected in the single frequency network subframe 620 from the neighbor base station 608. In an aspect, the single frequency network subframes may include at least one reference signal transmitted from different transmission points in the neighbor cell 602b. For example, the quality of the cell may include at least one of a RSRP or a RSRQ.

In FIG. 11A, at 1116, the UE may reselect to the neighbor cell when the quality of the neighbor cell is greater than or equal to a predetermined amount. For example, referring to FIG. 6, based on the measured quality of the neighbor cell 602b, the UE 604 may choose to reselect 605 from the serving cell 602a to the neighbor cell 602b when the quality of the neighbor cell is greater than or equal to a predetermined amount.

In FIG. 11B, at 1118, the UE may monitor unicast paging for a mobile alert. For example, referring to FIG. 6, the UE 604 may monitor 605 unicast paging for a mobile alert transmitted and/or broadcast by the serving base station 606 when camped on a notification only cell (e.g., serving cell 602a).

In FIG. 11B, at 1120, the UE may receive an SIB associated with the mobile alert in a unicast subframe or an MBSFN subframe. For example, referring to FIG. 6, the UE 604 may receive a SIB 610 associated with the mobile alert in a unicast subframe or a MBSFN subframe.

In FIG. 11B, at 1122, the UE may receive the mobile alert in the unicast subframe or the MBSFN subframe. For example, referring to FIG. 6, the mobile alert 610 may also be received in the unicast subframe or the MBSFN subframe.

In FIG. 11B, at 1124, the UE may receive a mobile alert in a PMCH in one or more MBSFN subframes. For example, referring to FIG. 6, the UE 604 may receive the mobile alert 610 in a PMCH in one or more MBSFN subframes transmitted and/or broadcast by the serving base station 606.

In FIG. 11B, at 1126, the UE may receive a list of one or more MBSFN services available in a region of the notification only cell. In one aspect, the region may include at least one of the notification only cell or neighboring cells that provide additional MBSFN services. In another aspect, the list may include information associated with at least one MBSFN channel, at least one MBSFN cell, cyclic prefix length, bandwidth used to transmit the MBSFN services, a cell identification, co-location, or supported services. For example, referring to FIG. 6, the UE 604 may receive a list 610 of one or more MBSFN services available in a region of the serving cell 602a (e.g., a notification only cell). For example, the region may include at least one of the serving cell 602a or one or more neighboring cells (e.g., neighbor cell 602b) that provide additional MBSFN services. In an aspect, the list may include information associated with at least one MBSFN channel, at least one MBSFN cell, cyclic prefix length, bandwidth, a cell identification, co-location, or supported services.

In FIG. 11B, at 1128, the UE may receive first signaling that indicates first subframes that include control information and second subframes that do not include the control information. For example, referring to FIG. 6, the serving cell 602a may include some subframes that have a control region (e.g., PDCCH) and other subframes that may not include a control region. Thus, the serving base station 606 may signal to the UE 604 which subframes have a control region and which do not. In addition, the serving base station 606 may signal the cyclic prefix and/or numerology associated with each subframe. For example, the UE 604 may receive first signaling 610 that indicates first subframes that include control information and second subframes that do not include the control information.

In FIG. 11B, at 1130, the UE may receive second signaling that indicates at least one of symbol length or a control region size associated with each subframe. In one aspect, the UE may determine which subframes include a control region and which subframes do not include a control region based on at least one of the symbol length (e.g., a subframe with a control region has a different symbol length than a subframe that does not include a control region). For example, referring to FIG. 6, the UE 604 may receive second signaling 610 that indicates at least one of symbol length or a control region size associated with each subframe.

In FIG. 11B, at 1132, the UE may determine at least one of a specific cyclic prefix length or numerology associated with each subframe based on one or more of the symbol length or the control region size. In one aspect, the UE may determine which subframes include a control region and which subframes do not include a control region based on at least one of the cyclic prefix length or numerology associated with each subframe (e.g., a subframe with a control region may have a different cyclic prefix length and/or numerology than a subframe that does not include a control region). For example, referring to FIG. 6, the UE 604 may determine 605 at least one of a specific cyclic prefix length or numerology associated with each subframe based on one or more of the symbol length or the control region size.

In FIG. 11B, at 1134, the UE may receive third signaling that indicates at least one of a cyclic prefix length or numerology associated with each subframe. In one aspect, the UE may determine which subframes include a control region and which subframes do not include a control region based on at least one of the cyclic prefix length or numerology associated with each subframe (e.g., a subframe with a control region may have a different cyclic prefix length and/or numerology than a subframe that does not include a control region). For example, referring to FIG. 6, the UE 604 may receive third signaling 610 that indicates at least one of a cyclic prefix length or numerology associated with each subframe. For example, the serving base station 606 may use a certain bit amount (e.g., 1 bit) for each of the first signaling, the second signaling, and the third signaling.

Figure 12:
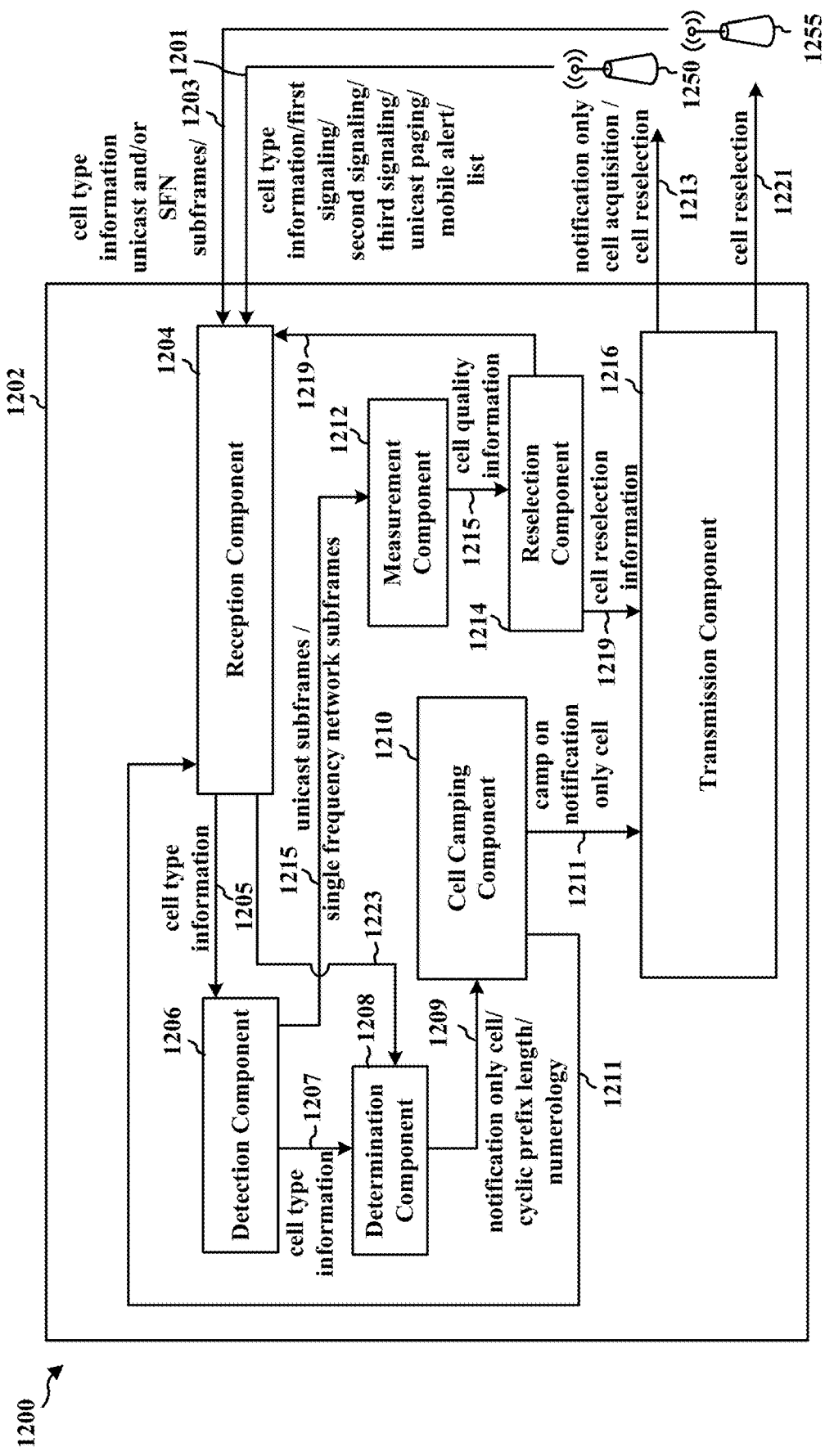
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a UE (e.g., UE 104, 350, 420, 425, 504, 604, the apparatus 902') in communication with a first base station 1250 (e.g., base station 102, 310, 412, 414, 508, 606) located in a first eMBMS standalone cell (e.g., serving cell 602a) and a second base station 1255 (e.g., base station 102, 310, 412, 414, 508, 608) located in a second eMBMS standalone cell (e.g., neighbor cell 602b).

The apparatus may include a reception component 1204 that receives one or more of cell type information 1201, first signaling 1201, second signaling 1201, third signaling 1201, unicast subframes 1201, single frequency network subframes 1201, and/or a mobile alert 1201 from first base station 1250. In addition, reception component 1204 may receive cell type information 1203, unicast subframes 1203, and/or single frequency network subframes 1203 from second base station 1255. Reception component 1204 may send a signal 1205 associated with one or more of the cell type information 1201, 1203, unicast subframes 1203, single frequency network subframes 1203, first signaling 1201, second signaling 1201, third signaling 1201, and/or a mobile alert 1201 to detection component 1206. Detection component 1206 may detect a cell type as part of a mobile alert service cell camping procedure. For example, the cell type of the first eMBMS cell may be detected based on the cell type information 1201 received from first base station 1250. The cell type of the second eMBMS cell may be detected based on the cell type information 1203 received from second base station 1255. Detection component 1206 may send a signal 1207 associated with one or more of the cell type information associated with the first base station 1250 and/or the second base station 1255 to determination component 1208. Determination component 1208 may determine that the cell type of the first base station 1250 is a notification only cell (e.g., neither a suitable cell nor an acceptable cell). In addition, determination component 1208 may determine that the cell type of the second base station 1255 is also a notification only cell (e.g., neither a suitable cell nor an acceptable cell). Determination component 1208 may send a signal 1209 indicating that the respective cells associated with the first base station 1250 and the second base station 1255 are both notification only cells to cell camping component 1210. Cell camping component 1210 may camp on the notification only cell associated with the first base station 1250 based on the signal 1209 indicating that the respective cells associated with the first base station 1250 and the second base station 1255 are both notification only cells. Cell camping component 1210 may send a signal 1211 indicating to transmission component 1216 and/or reception component 1204 that the apparatus 1202 is camping on the serving cell. Transmission component 1216 may send a signal 1213 to first base station 1250 indicating that the apparatus 1202 is camping on the serving. In addition, detection component 1206 may detect unicast subframes or single frequency network subframes transmitted and/or broadcast by the second base station 1255 based on the signal 1205 received from reception component 1204. Detection component 1206 may send a signal 1215 associated with the unicast subframes or single frequency network subframes to measurement component 1212. Measurement component 1212 may measure a quality of the cell associated with the second base station 1255 based on the at least one CRS when the signal 1215 includes information associated with unicast subframes. Additionally and/or alternatively, measurement component 1212 measure a quality of the cell associated with the second base station 1255 based on the at least one MBSFN-RS when the signal 1215 includes information associated with single frequency network subframes. Measurement component 1212 may send a signal 1217 associated with a quality of the cell associated with the second base station 1255 to reselection component 1214. Reselection component 1214 may reselect to the neighbor cell when the quality of the neighbor cell is greater than or equal to a predetermined amount. Reselection component 1214 may send a signal 1219 associated with cell reselection to transmission component 1216 and/or reception component 1204. Transmission component 1216 may send a signal 1213, 1221 to one or more of the first base station 1250 and/or the second base station 1255 indicating that the apparatus 1202 is reselecting to the cell associated with the second base station 1255 (e.g., neighboring cell). In addition, reception component 1204 may monitor unicast paging for a mobile alert 1201 from the first base station 1250 when camped on the serving cell or from the second base station 1255 when camped on the neighbor cell. Reception component 1204 may receive an SIB 1201 associated with the mobile alert in a unicast subframe or an MBSFN subframe received from the first base station 1250. Further, reception component 1204 may receive the mobile alert 1201 in a PMCH in one or more MBSFN subframes from the first base station 1250. Additionally and/or alternatively, reception component 1204 may receive a list 1201 of one or more MBSFN services available in a region of the notification only cell (e.g. serving cell) from the first base station 1250. In one aspect, the region may include at least one of the notification only cell or neighboring cells that provide additional MBSFN services. In another aspect, the list may include information associated with at least one MBSFN channel, at least one MBSFN cell, cyclic prefix length, bandwidth, a cell identification, co-location, or supported services. Further, reception component 1204 may receive first signaling 1201 from first base station 1250 that indicates first subframes that include control information and second subframes that do not include the control information. Reception component 1204 may receive second signaling 1201 from first base station 1250 that indicates at least one of symbol length or a control region size associated with each subframe. Reception component 1204 may send a signal 1223 to determination component 1208 associated with at least one of symbol length or a control region size associated with each subframe. Determination component 1208 may determine which subframes include a control region and which subframes do not include a control region based on at least one of the symbol length (e.g., a subframe with a control region has a different symbol length than a subframe that does not include a control region). Additionally and/or alternatively, determination component 1208 may determine at least one of a specific cyclic prefix length or numerology associated with each subframe based on the signal 1223 associated with one or more of the symbol length or the control region size. In one aspect, determination component 1208 may determine which subframes include a control region and which subframes do not include a control region based on at least one of the cyclic prefix length or numerology associated with each subframe (e.g., a subframe with a control region may have a different cyclic prefix length and/or numerology than a subframe that does not include a control region). Reception component 1204 may receive third signaling 1201 from the first base station 1250 that indicates at least one of a cyclic prefix length or numerology associated with each subframe. Reception component 1204 may send a signal 1223 to determination component 1208 associated with at least one of the cyclic prefix length or the numerology associated with each subframe. In one aspect, determination component 1208 may determine which subframes include a control region and which subframes do not include a control region based on at least one of the cyclic prefix length or numerology associated with each subframe (e.g., a subframe with a control region may have a different cyclic prefix length and/or numerology than a subframe that does not include a control region).

The apparatus may include additional components that perform each of the blocks of the algorithm in the aforementioned flowcharts of FIGS. 11A and 11B. As such, each block in the aforementioned flowcharts of FIGS. 11A and 11B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
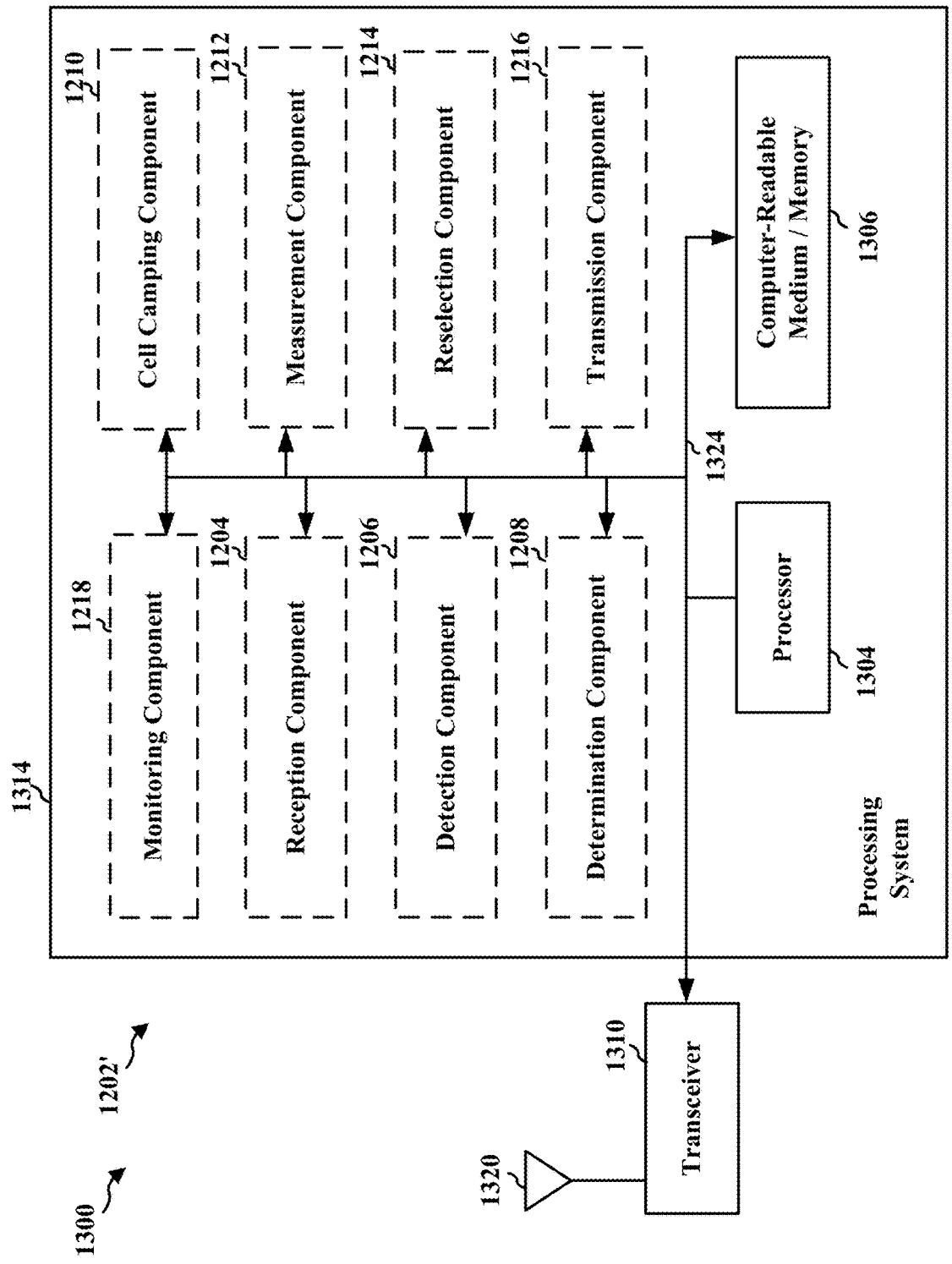
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, 1216 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1216, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214, 1216. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for wireless communication may include means for detecting a cell type as part of a mobile alert service cell camping procedure. In an aspect, the cell type may be one of a suitable cell, an acceptable cell, or a notification only cell. In another aspect, the notification only cell may be associated with an eMBMS standalone service. In a further aspect, the mobile alert service cell camping procedure may include at least one of an ETWS cell camping procedure or a CMAS cell camping procedure. In another aspect, the suitable cell may provide wireless communication services to a UE, the acceptable cell may provide emergency mobile alerts and emergency calls, and the notification only cell may provide emergency mobile alerts and eMBMS services. In another configuration, the apparatus 1202/1202' for wireless communication may include means for determining that the cell type is neither the suitable cell, nor the acceptable cell. In a further configuration, the apparatus 1202/1202' for wireless communication may include means for camping on the notification only cell based on the determination. Additionally, the apparatus 1202/1202' for wireless communication may include means for detecting unicast subframes transmitted by a neighbor cell. In one aspect, the unicast subframes may include at least one CRS. Furthermore, the apparatus 1202/1202' for wireless communication may include means for measuring a quality of the cell based on the at least one CRS. In a further configuration, the apparatus 1202/1202' for wireless communication may include means for reselecting to the neighbor cell when the quality of the cell is greater than or equal to a predetermined amount. In another configuration, the apparatus 1202/1202' for wireless communication may include means for detecting single frequency network subframes transmitted by a neighbor cell. In an aspect, the SFN subframes may include at least one reference signal transmitted from different transmission points. In a further configuration, the apparatus 1202/1202' for wireless communication may include means for measuring a quality of the cell based on the at least one reference signal. Still further, the apparatus 1202/1202' for wireless communication may include means for reselecting to the neighbor cell when the quality of the cell is greater than or equal to a predetermined amount. In an aspect, the quality of the cell may include at least one of an RSRP or an RSRQ. In addition, the apparatus 1202/1202' for wireless communication may include means for monitoring unicast paging for a mobile alert. Further, the apparatus 1202/1202' for wireless communication may include means for receiving an SIB associated with the mobile alert in a unicast subframe or an MBSFN subframe. Additionally, the apparatus 1202/1202' for wireless communication may include means for receiving the mobile alert in the unicast subframe or the MBSFN subframe. In another configuration, the apparatus 1202/1202' for wireless communication may include means for receiving a mobile alert in a PMCH in one or more MBSFN subframes. In an additional configuration, the apparatus 1202/1202' for wireless communication may include means for receiving a list of one or more MBSFN services available in a region of the notification only cell. In an aspect, the region may include at least one of the notification only cell or neighboring cells that provide additional MBSFN services. In another aspect, the list may include information associated with at least one MBSFN channel, at least one MBSFN cell, cyclic prefix length, bandwidth, a cell identification, co-location, or supported services. In a further configuration, the apparatus 1202/1202' for wireless communication may include means for receiving first signaling that indicates first subframes that include control information and second subframes that do not include the control information. Still further, the apparatus 1202/1202' for wireless communication may include means for receiving second signaling that indicates at least one of symbol length or a control region size associated with each subframe. In another configuration, the apparatus 1202/1202' for wireless communication may include means for determining at least one of a specific cyclic prefix length or numerology associated with each subframe based on one or more of the symbol length or the control region size. In a further configuration, the apparatus 1202/1202' for wireless communication may include means for determining at least one of a specific cyclic prefix length or a specific numerology associated with each subframe based on the third signaling. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a user equipment (UE), comprising:
   a memory; and
   at least one processor coupled to the memory and configured to:
   receive cell acquisition information associated with a multicast broadcast service (MBS) standalone cell;
   detect a scrambling sequence associated with the cell acquisition information, the scrambling sequence configured to allow the UE to acquire the MBS standalone cell based on recognition of the scrambling sequence associated with the cell acquisition information; and
   perform cell acquisition with the MBS standalone cell based on the scrambling sequence.

2. The apparatus of claim 1, wherein the scrambling sequence is recognizable by a first type of UE that is configured to recognize a characteristic associated with the cell acquisition and unrecognizable by a second type of UE that is not configured to recognize the characteristic associated with the cell acquisition.

3. The apparatus of claim 2, wherein the UE is the first type of UE that is configured to recognize the characteristic associated with the cell acquisition.

4. The apparatus of claim 1, wherein the scrambling sequence corresponds to at least one of a modified primary synchronization signal (PSS) scrambling sequence, a modified secondary synchronization signal (SSS) scrambling sequence, a modified physical broadcast channel (PBCH) scrambling sequence, or a modified master information block (MIB) scrambling sequence.

5. The apparatus of claim 4, wherein the modified PBCH scrambling sequence is initialized every 16 radio frames.

6. The apparatus of claim 4, wherein at least one of the modified PSS scrambling sequence or the modified SSS scrambling sequence includes a fixed cyclic prefix length.

7. The apparatus of claim 4, wherein at least one of the modified PSS scrambling sequence or the modified SSS scrambling sequence includes a fixed symbol duration.

8. The apparatus of claim 1, wherein the cell acquisition information is included in a synchronization channel that is received in a broadcast mode.

9. The apparatus of claim 1, wherein the cell acquisition information is included in a discovery subframe that is received in a unicast mode.

10. The apparatus of claim 9, wherein the discovery subframe includes at least one of a primary synchronization signal (PSS), a secondary synchronization signal (SSS), a physical broadcast channel (PBCH), a cell-specific reference signal (CRS), a system information block (SIB), or a master information block (MIB).

11. An apparatus for wireless communication at a user equipment (UE), comprising:
a memory; and
at least one processor coupled to the memory and configured to:
receive synchronization information including a scrambling sequence associated with a multicast broadcast service (MBS) standalone cell;
descramble the synchronization information based on the UE recognizing that the scrambling sequence is associated with the MBS standalone cell, the scrambling sequence configured to allow the UE to acquire the MBS standalone cell after the synchronization information is descrambled; and
perform cell acquisition with the MBS standalone cell based on the synchronization information being descrambled.

12. The apparatus of claim 11, wherein the scrambling sequence is recognizable by a first type of UE that is configured to recognize a characteristic associated with the cell acquisition and unrecognizable by a second type of UE that is not configured to recognize the characteristic associated with the cell acquisition, and wherein the UE is the first type of UE that is configured to recognize the characteristic associated with the cell acquisition.

13. The apparatus of claim 11, wherein the synchronization information corresponds to at least one of a modified primary synchronization signal (PSS) scrambling sequence, a modified secondary synchronization signal (SSS) scrambling sequence, or a modified physical broadcast control channel (PBCH) scrambling sequence.

14. The apparatus of claim 13, wherein the at least one of the modified PSS scrambling sequence or the modified SSS scrambling sequence includes at least one of a fixed cyclic prefix length or a fixed symbol duration.

15. The apparatus of claim 11, wherein the synchronization information includes cell acquisition information for the MBS standalone cell.

16. A method of wireless communication at a user equipment (UE), comprising:
receiving cell acquisition information associated with a multicast broadcast service (MBS) standalone cell;
detecting a scrambling sequence associated with the cell acquisition information, the scrambling sequence configured to allow the UE to acquire the MBS standalone cell based on recognition of the scrambling sequence associated with the cell acquisition information; and
performing cell acquisition with the MBS standalone cell based on the scrambling sequence.

17. The method of claim 16, wherein the scrambling sequence is recognizable by a first type of UE that is configured to recognize a characteristic associated with the cell acquisition and unrecognizable by a second type of UE that is not configured to recognize the characteristic associated with the cell acquisition.

18. The method of claim 17, wherein the UE is the first type of UE that is configured to recognize the characteristic associated with the cell acquisition.

19. The method of claim 16, wherein the scrambling sequence corresponds to at least one of a modified primary synchronization signal (PSS) scrambling sequence, a modified secondary synchronization signal (SSS) scrambling sequence, a modified physical broadcast channel (PBCH) scrambling sequence, or a modified master information block (MIB) scrambling sequence.

20. The method of claim 19, wherein the modified PBCH scrambling sequence is initialized every 16 radio frames.

21. The method of claim 19, wherein at least one of the modified PSS scrambling sequence or the modified SSS scrambling sequence includes a fixed cyclic prefix length.

22. The method of claim 19, wherein at least one of the modified PSS scrambling sequence or the modified SSS scrambling sequence includes a fixed symbol duration.

23. The method of claim 16, wherein the cell acquisition information is included in a synchronization channel that is received in a broadcast mode.

24. The method of claim 16, wherein the cell acquisition information is included in a discovery subframe that is received in a unicast mode.

25. The method of claim 24, wherein the discovery subframe includes at least one of a primary synchronization signal (PSS), a secondary synchronization signal (SSS), a physical broadcast channel (PBCH), a cell-specific reference signal (CRS), a system information block (SIB), or a master information block (MIB).

26. A method of wireless communication at a user equipment (UE), comprising:
receiving synchronization information including a scrambling sequence associated with a multicast broadcast service (MBS) standalone cell;
descrambling the synchronization information based on the UE recognizing that the scrambling sequence is associated with the MBS standalone cell, the scrambling sequence configured to allow the UE to acquire the MBS standalone cell after the synchronization information is descrambled; and
performing cell acquisition with the MBS standalone cell based on the synchronization information being descrambled.

27. The method of claim 26, wherein the scrambling sequence is recognizable by a first type of UE that is configured to recognize a characteristic associated with the cell acquisition and unrecognizable by a second type of UE that is not configured to recognize the characteristic associated with the cell acquisition, and wherein the UE is the first type of UE that is configured to recognize the characteristic associated with the cell acquisition.

28. The method of claim 26, wherein the synchronization information corresponds to at least one of a modified primary synchronization signal (PSS) scrambling sequence, a modified secondary synchronization signal (SSS) scrambling sequence, or a modified physical broadcast control channel (PBCH) scrambling sequence.

29. The method of claim 28, wherein the at least one of the modified PSS scrambling sequence or the modified SSS scrambling sequence includes at least one of a fixed cyclic prefix length or a fixed symbol duration.

30. The method of claim 26, wherein the synchronization information includes cell acquisition information for the MBS standalone cell.

\* \* \* \* \*